United States Patent
Narang et al.

(10) Patent No.: US 10,963,700 B2
(45) Date of Patent: Mar. 30, 2021

(54) CHARACTER RECOGNITION

(71) Applicant: ACCENTURE GLOBAL SOLUTIONS LIMITED, Dublin (IE)

(72) Inventors: Neeru Narang, San Jose, CA (US); Guanglei Xiong, Pleasanton, CA (US); Colin Connors, Campbell, CA (US); Sukryool Kang, Sunnyvale, CA (US); Chung-Sheng Li, San Jose, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 147 days.

(21) Appl. No.: 16/513,254

(22) Filed: Jul. 16, 2019

(65) Prior Publication Data
US 2020/0089962 A1    Mar. 19, 2020

Related U.S. Application Data

(60) Provisional application No. 62/731,842, filed on Sep. 15, 2018.

(51) Int. Cl.
*G06K 9/00* (2006.01)
*G06T 7/73* (2017.01)
(Continued)

(52) U.S. Cl.
CPC ..... *G06K 9/00744* (2013.01); *G06K 9/00228* (2013.01); *G06K 9/00288* (2013.01);
(Continued)

(58) Field of Classification Search
CPC ........... G06K 9/00744; G06K 9/00228; G06K 9/00288; G06K 9/6267; G06K 9/00362;
(Continued)

(56) References Cited

U.S. PATENT DOCUMENTS 9,176,987 B1 * 11/2015 Peng .................... G06F 16/5846
9,336,433 B1 *  5/2016 Ortiz .................... G06K 9/3233
(Continued)

FOREIGN PATENT DOCUMENTS

WO    2018/089210    5/2018

OTHER PUBLICATIONS

Werner Bailer, et al., "Semi-Automatic Content Annotation", In: "Media Production, Delivery and Interaction for Platform Independent Systems", Dec. 19, 2013, pp. 166-208.

*Primary Examiner* — Wesley J Tucker
(74) *Attorney, Agent, or Firm* — Mannava &. Kang, P.C.

(57) ABSTRACT

Examples of a character recognition system are provided. In an example, the system may receive an object detection requirement pertaining to a video clip. The system may identify a visual media feature map from visual media data to process the object detection requirement. The system may implement an artificial intelligence component to segment the visual media feature map into a plurality of regions, and identify a plurality of image proposals therein. The system may implement a first cognitive learning operation to allocate a human face identity for a human face and an object name for an object present in the video clip. The system may determine a face identity model for the human face present in the plurality of image proposals and generate a tagged face identity model. The system may implement a second cognitive learning operation to assemble the plurality of frames with an appurtenant tagged face identity model.

20 Claims, 30 Drawing Sheets

(51) Int. Cl.
*G06T 7/11* (2017.01)
*G06T 7/246* (2017.01)
*G06K 9/62* (2006.01)
*G06T 11/20* (2006.01)

(52) U.S. Cl.
CPC .............. *G06K 9/6267* (2013.01); *G06T 7/11* (2017.01); *G06T 7/246* (2017.01); *G06T 7/74* (2017.01); *G06T 11/20* (2013.01); *G06T 2207/10016* (2013.01); *G06T 2207/20081* (2013.01); *G06T 2207/30196* (2013.01); *G06T 2210/12* (2013.01)

(58) Field of Classification Search
CPC ..... G06K 2009/3291; G06T 7/74; G06T 7/11; G06T 7/246; G06T 11/20; G06T 2207/10016; G06T 2207/20081; G06T 2207/30196; G06T 2210/12
See application file for complete search history.

(56) References Cited

U.S. PATENT DOCUMENTS

| | | | |
|---|---|---|---|
| 2013/0294642 A1* | 11/2013 | Wang | G06K 9/00261 382/103 |
| 2017/0251261 A1* | 8/2017 | James | H04N 21/4725 |
| 2018/0114056 A1* | 4/2018 | Wang | G06K 9/00295 |
| 2018/0204111 A1 | 7/2018 | Zadeh et al. | |
| 2019/0050629 A1* | 2/2019 | Olgiati | G06T 7/20 |
| 2019/0065825 A1* | 2/2019 | Kuo | G06K 9/00268 |
| 2019/0236371 A1* | 8/2019 | Boonmee | G06K 9/00765 |
| 2019/0289359 A1* | 9/2019 | Sekar | H04N 21/4722 |

\* cited by examiner

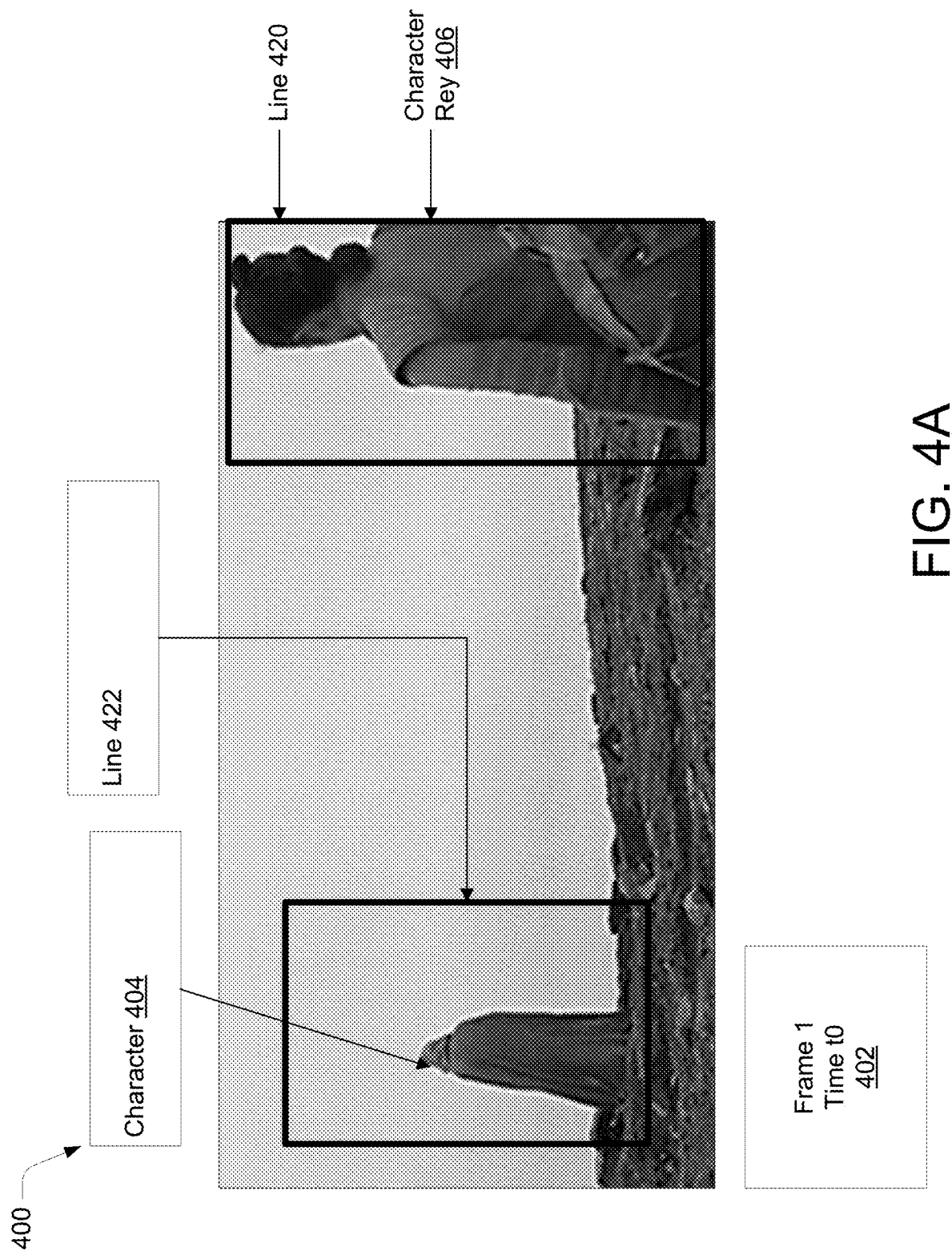

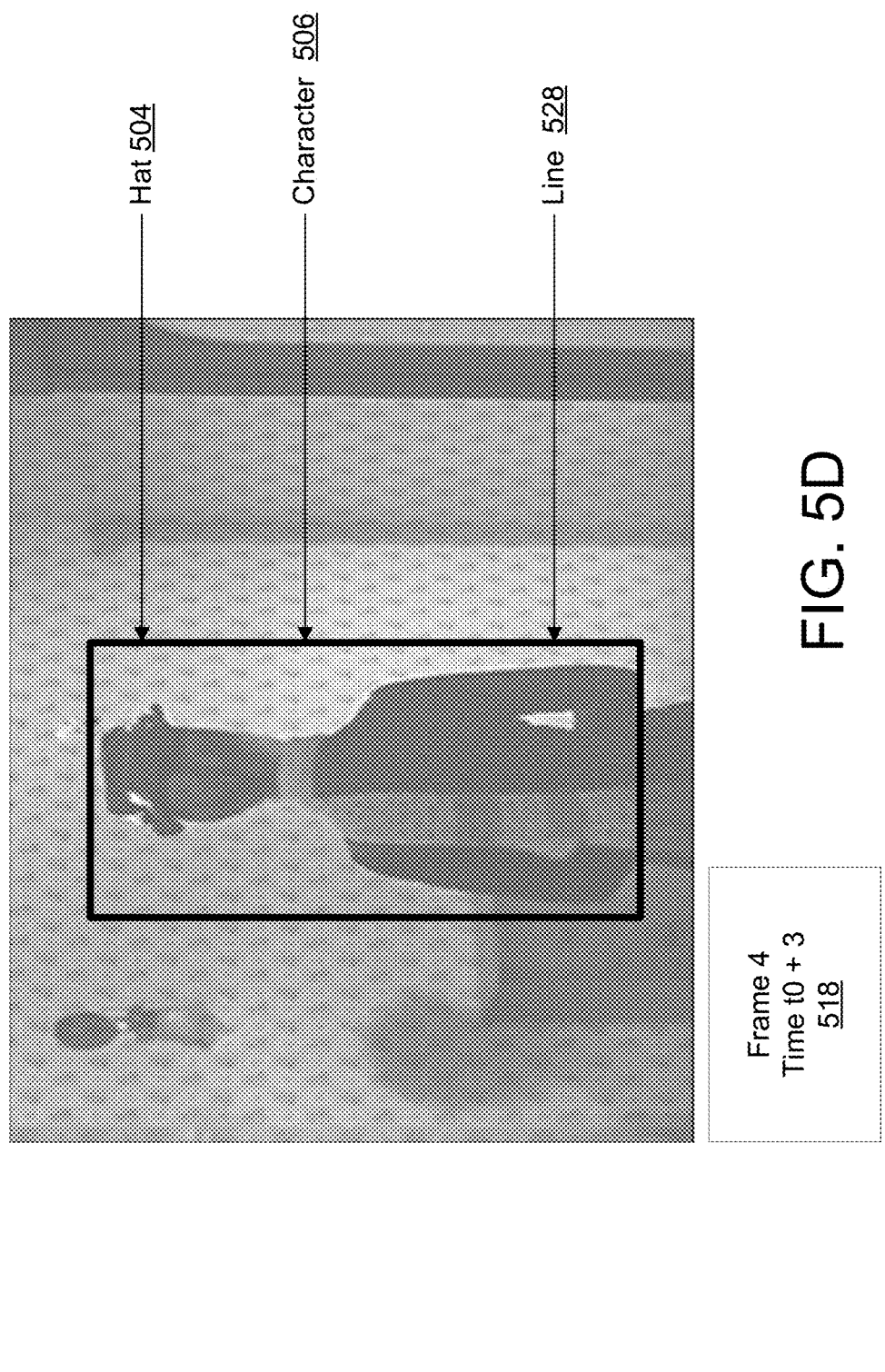

CHARACTER RECOGNITION

PRIORITY CLAIM

This application claims priority from U.S. provisional application No. 62/731,842 filed on Sep. 15, 2018, the disclosure of which is incorporated by reference in its entirety herein.

BACKGROUND

The importance of Artificial Intelligence (AI) as a tool for recognition of human facial features and various objects in a video clip has increased significantly in recent times. For example, AI may be used to identify various characters and objects associated with those characters in a video clip. In particular, AI may be used to determine names and allied information regarding various characters in a video clip. These mechanisms include, for example, various AI tools developed for human face detection recognition and analysis by organizations such as, Amazon®, Google®, Microsoft®, IBM®, Affectiva®, and OpenCV®. However, such methods may be limited to forward-facing stills where prominent facial features are not occluded. Such tools may be highly dependent on optimal lighting conditions and direct capture of the target's face. For example, the face of a person may be occluded from view in a video clip. Various tools and techniques, which may be frequently used for face detection such as, for example, the Glasgow face matching test, the Cambridge face memory test, and the 30/60 face recognition test may lack the capability to recognize such a person from an alternative part of the same video clip. Also, most AI tools and techniques require human intervention for application of various face identity tests across the video clip. Such a process may be labor intensive and not scalable across thousands of hours of a video clip.

Additionally, a sizeable number of digital marketing validations require a particular product to be identified across a video clip. For example, when an organization sponsors an event, there may be a requirement to showcase a particular product throughout a video clip associated with the event. However, most organizations may not be able to keep track of such products being showcased across the video clip through the existing identification system. There may, therefore, be a need for an identification system, which may be applied to a video clip for identifying people and objects such as, for example, a video character or an object, with minimal human intervention in an accurate and efficient manner. There may also be a need for a character recognition system that can account for diverse factors such as, for example, facial features of people, various objects associated with various people, and to accurately identify people and objects in a video clip.

Accordingly, a technical problem with the currently available face identification system is that they may be inefficient, inaccurate, and/or not scalable. There is a need for a real-time intelligent character recognition system that may account for the various factors mentioned above amongst others to generate a unique identity for each character and object despite the individual being temporarily occluded from a view in a video clip.

BRIEF DESCRIPTION OF DRAWINGS

FIGS. 4A-4F illustrate a use case pictorial representation of a process for objection detection, image recognition and cognitive tracking based on the system for character recognition, according to an example embodiment of the present disclosure.

FIGS. 5A-5E illustrate a use case pictorial representation of a process for objection detection, image recognition and cognitive tracking based on the system for character recognition, according to an example embodiment of the present disclosure.

DETAILED DESCRIPTION

Figure 1:
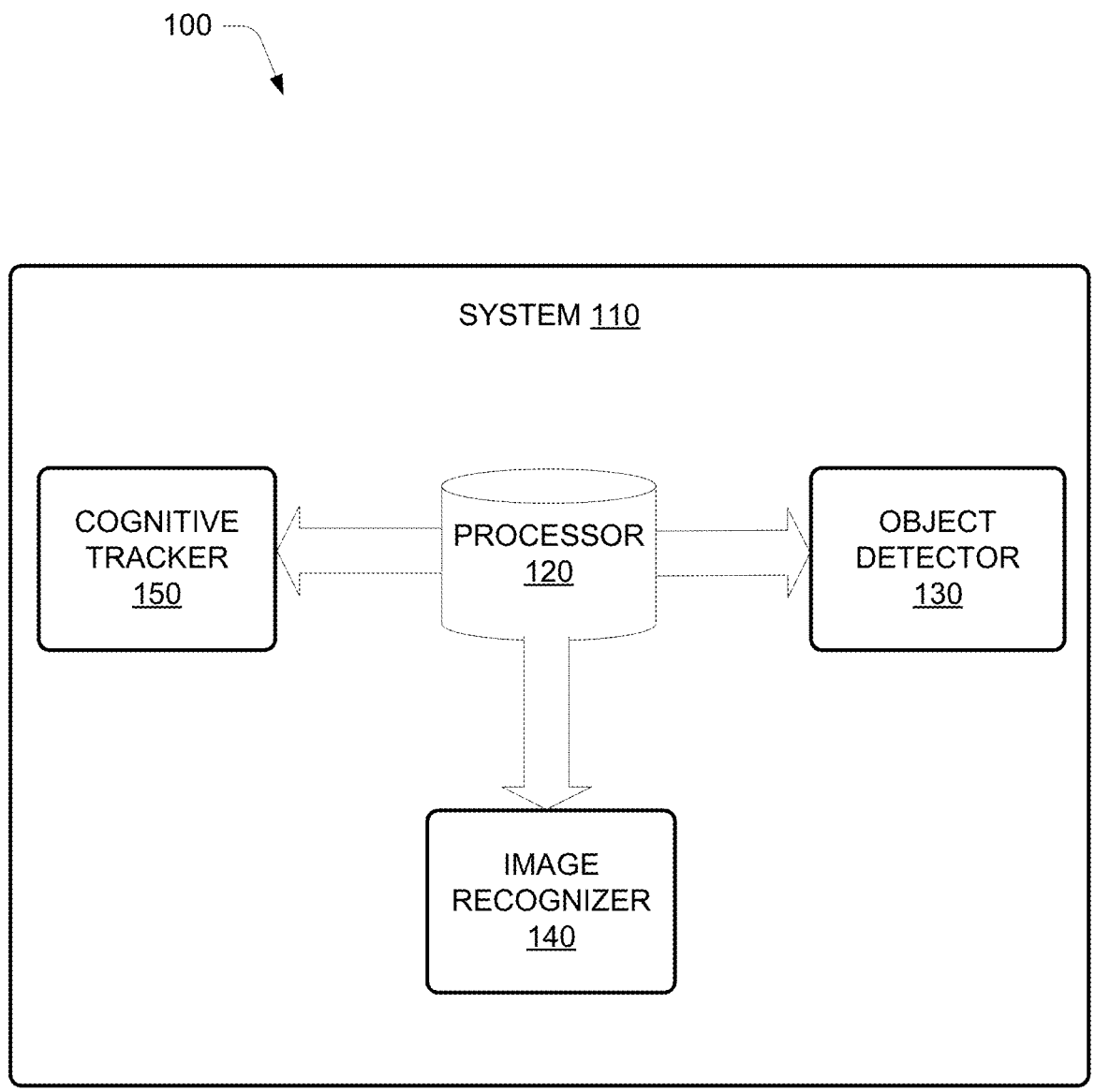
FIG. 1 illustrates a diagram for a system for character recognition, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to.

The present disclosure describes systems and methods for a character recognition system (CRS). The character recognition system (referred to as "system") may be used for simultaneous recognition and tracking of multiple characters and objects between consecutive frames under challenging scenarios. For example, the system may be used for recognition of human faces in both real-time and offline mode of a video clip. The system may be used for identifying product placement in a video clip. The system may be used for identifying various characters in a television series, movie, sports event and the like. The system may be used for assimilating information about various identified characters and develop video clips including information about a character even when the face of a character may be temporarily occluded from a view in a particular part of the video clip. The system may detect various objects in a video clip and associate the same with various characters. The system may be used to backtrack all parts of a video clip wherein facial features of a character may be occluded from a view but an associated object may be visible. The system may be used for video tagging with minimal requirement of human annotation.

The system may include a processor, an object detector, an image recognizer, and a cognitive tracker. The processor may be coupled to the object detector, the image recognizer, and the cognitive tracker. The object detector may be configured to receive an object detection requirement from a user. The object detection requirement may be pertaining to a video clip. For example, the object detection requirement may pertain to a requirement for detection of various characters in a movie and video tagging the movie with character names, and character information for all frames of the video clip. In an example, the video clip is to further comprise a real-time moving visual media. The object detector may identify a visual media feature map from visual media data to process the object detection requirement. The visual media data may be obtained from a plurality of frames associated with the video clip. The visual media data may further comprise an image of a character, an image of an object, a name of the character, a label for the object, and an audio channel. The object detector may implement an artificial intelligence component to augment the visual media feature map by retrieving ancillary data associated with the video clip from a plurality of sources. In an example, the plurality of sources used for augmenting the visual media feature map may include an audio clip associated with the video clip and a dataset associated with the human face identity for the human face present in the plurality of image proposals. Additionally, the object detector may implement the artificial intelligence component to segment the visual media feature map into a plurality of regions. Further, the object detector may implement the artificial intelligence component to identify a plurality of image proposals from each of the plurality of regions.

The image recognizer may be coupled to the processor. The image recognizer may implement a first cognitive learning operation to allocate a human face identity for a human face present in the plurality of image proposals. The image recognizer may further implement the first cognitive learning operation to allocate an object name for an object present in the plurality of image proposals. The image recognizer may implement the first cognitive learning operation to determine a face identity model for the human face present in the plurality of image proposals. The face identity model may include the human face identity and the object name pertinent to the human face identity. The image recognizer may implement the first cognitive learning operation to associate the face identity model for the human face with the pertinent object name and the visual media data for generating a tagged face identity model.

The cognitive tracker may be coupled to the processor. The cognitive tracker may implement a second cognitive learning operation to determine whether the tagged face identity model for the human face is corroborating with the visual media feature map across the plurality of frames. The cognitive tracker may implement a second cognitive learning operation to assemble a first frame from the plurality of frames of the video clip with an appurtenant tagged face identity model. The appurtenant tagged face identity model may refer to a tagged face identity model, which may be relevant for video tagging a particular character present in the video clip based on facial features of the character and/or an object associated with the character. The cognitive tracker may implement a second cognitive learning operation for determining an appurtenance index to indicate an accuracy level for application of the tagged face identity model to a particular frame. The appurtenance index may indicate a level of accuracy for video tagging for particular character present in the video clip when facial features of the character may be temporarily occluded.

The embodiments for the object detection requirements presented herein are exemplary in nature and should be treated as such. For the sake of brevity and technical clarity, the description of the character recognition system may be restricted to few exemplary embodiments, however, to a person skilled in the art it should be clear that the character recognition system may be used for the fulfillment of various object detection requirements other than those mentioned hereinafter.

Accordingly, the present disclosure aims to provide a real intelligence character recognition system which will consider the right set of criteria, and the impact of the criteria for video tagging a video clip. The system may constantly sense new characters as they emerge in a video frame, evaluate and recognize the characters, and track the characters across the video clip for video tagging. The present disclosure provides for efficient and continuous analysis of data from a video clip. The system may be configured to support human decision making for processing a video tagging requirement. Because the system may capture all relevant elements (processes and/or features) of a problem and the subsequent analysis of the problem may be performed based on identity models corresponding to the characters, the analysis may be substantially free from errors.

FIG. 1 illustrates a system for character recognition system 110 (referred to as system 110 hereinafter), according to an example implementation of the present disclosure. In an example, the system 110 may include a processor 120. The processor 120 may be coupled to an object detector 130, an image recognizer 140 and a cognitive tracker 150.

In accordance with an embodiment of the present disclosure, the object detector 130 may be configured to receive an object detection requirement from a user. The object detection requirement may pertain to a video clip. The object detection requirement may refer to identifying, recognizing and tracking an object within the video clip. In an example, the object may be a character associated with the video clip. In an example, the object may refer to a product, which may be present in the video clip. For example, the object detection requirement may pertain to a requirement for detection of various characters in a movie and video tagging the movie with character names, and character information for all frames of the video clip. In an example, the video clip is to further comprise a real-time moving visual media. In accordance with an exemplary embodiment of the present disclosure, the object detection requirement may pertain to detecting and recognizing various characters in a movie or a TV series. In an example, the object detection requirement may pertain to recognizing various players involved in a sports event. The object detection requirement may pertain to recognition and placement of various products in a video clip, for example, a user might want to check a number of times a particular product from a specific brand has been used in a video clip. The embodiments for the object detection requirements presented herein are exemplary in nature and should be treated as such. For the sake of brevity and technical clarity, the description of the character recognition system may be restricted to few exemplary embodiments, however, to a person skilled in the art it should be clear that the character recognition system (system 110) may be used for fulfillment of various forecasting requirements other than those mentioned hereinafter.

The object detector 130 may identify a visual media feature map from visual media data to process the object detection requirement. The visual media data may be obtained from a plurality of frames associated with the video clip. The plurality of frames may include various still images which compose the complete video clip. The visual media data may further comprise an image of a character, an image of an object, a name of the character, a label for the object, and an audio channel. The visual media feature map may include a measurable factor or an attribute, which may be forming one of a set that may define a condition for processing the object detection requirement. In an example, the visual media feature map may include multiple measurable factors that would have an impact on the purpose of the object detection requirement. For example, the purpose of the forecasting may be to detect, recognize and track various characters present in a video clip pertaining to a movie. The object detector 130 may search through the visual media data and identify measurable factors, which may have an impact on the various characters present in a video clip. For example, the object detector 130 may identify different characters, which may be present in the video clip. The object detector 130 may access the visual media data for identifying various categories, which may be used for identification and classification of various features associated with each of the characters. The object detector 130 may identify a unique feature associated with each character within a video clip. For example, a number printed on the uniform of a player engaged in a sports event or a particular type of apparel, which may always be worn only by a particular character within the video clip. In an example, the unique feature may be a product, which a character may always hold within the video clip. In an example, a unique feature may be a particular audio channel which may always be associated with a particular character. Further, the object detector 130 may identify other measurable factors (not mentioned herein), which may be relevant for the processing the object detection requirement of identifying, recognizing and tracking various characters present in a video clip (explained further in detail with more exemplary embodiments by way of subsequent Figs.).

The object detector 130 may implement an artificial intelligence component (explained in detail by way of FIG. 2) to augment the visual media feature map by retrieving an ancillary data set associated with the video clip from a plurality of sources. In accordance with an embodiment of the present disclosure, the plurality of data sources may include various data channels associated with the video clip. The ancillary data associated with the video clip may include an audio channel, a screenplay, a script for the video clip. In an example, the ancillary data set may be retrieved from an external source, which may be associated with the video clip, but not embedded therein. For example, in a video clip pertaining to a sports event, the ancillary data set may include data retrieved from an associated commentary. In an example, the video clip may be a movie and the ancillary data set may be retrieved from a screenplay or a movie script, which may be provided by a production team of the movie. The visual media feature map may segregate the video clip into various categories based on visual features for each character.

Additionally, the object detector 130 may implement the artificial intelligence component to segment the visual media feature map into a plurality of regions. In accordance with an embodiment of the present invention, each of the plurality of regions may indicate a particular part of a frame from the plurality of frames, which compose the video clip. Each region from the plurality of regions may include a conglomerate of various characters and objects sorted from the visual media feature map through the implementation of the artificial intelligence component. Further, the object detector 130 may implement the artificial intelligence component to identify a plurality of image proposals from each of the plurality of regions. As mentioned above, each region from the plurality of regions may include a conglomerate of various characters and objects. The artificial intelligence component may be implemented to generate possible images pertaining to a human or an object from the plurality of regions. The possible images so generated may be referred to as the plurality of image proposals. In an example, the plurality of image proposals may include an image proposal, which may be identified by the system 110 as a possible character within the video clip. In an example, the image proposal may include a human face. In an example, the image proposal may include a particular object of interest, which may be indicated by a user through the object detection requirement. Each of the plurality of image proposals may be considered by the system for performing tasks of image recognition and image tracking. In an example, the plurality of sources used for augmenting the visual media feature map may include an audio clip associated with the video clip and a dataset associated with the human face identity for the human face present in the plurality of image proposals.

The image recognizer 140 may be coupled to the processor 120. The image recognizer 140 may implement a first cognitive learning operation (explained in detail by way of FIG. 2) to allocate a human face identity for a human face present in the plurality of image proposals. As mentioned above the system 110 may generate the plurality of image proposals over each frame from the plurality of frames. The image recognizer 140 may implement the first cognitive learning operation and recognize a person in the image and generate a human identity for each human face present in each of the plurality of image proposals (explained in detail by way of subsequent Figs.). The image recognizer 140 may further implement the first cognitive learning operation to allocate an object name for an object present in the plurality of image proposals. Additionally, the image recognizer 140 may implement the first cognitive learning operation to recognize various objects with the plurality of image proposals. The image recognizer 140 may allocate the object name for each object. The image recognizer 140 may implement the first cognitive learning operation to determine a face identity model for the human face present in the plurality of image proposals. The face identity model may include the human face identity and the object name pertinent to the human face identity. The face identity model may be used by the system 110 for tracking a particular human face across the video clip (as explained by way of subsequent paragraphs). The face identity model may be a data set wherein each human face identified would include a set of the object names, which may be detected, and identified in the vicinity of the human face. In an example, the face identity model may include multiple objects detected and identified in the vicinity of the human face. The system 110 may be configured such as to include all the objects detected and identified in the vicinity of the human face into face identity model.

The image recognizer 140 may implement the first cognitive learning operation to associate the face identity model for the human face with the pertinent object name and the visual media data for generating a tagged face identity model. As mentioned above, the face identity model may include the human face identity and all the object names identified in the vicinity of the human face. The system 110 may identify the object names, which may be pertinent to the human face identity across the plurality of frames in the video clip. For example, there may be an object like a lamp detected in the vicinity of a human face, although the lamp may not always be present in the vicinity of the same human face across the video clip. The image recognizer 140 may implement the first cognitive learning operation to identify such objects and sanitize the face identity model to include the human face identity and the object names pertinent to the human face identity. Further, the image recognizer 140 may implement the first cognitive learning operation to analyze the visual media data and associate the same with the sanitized face identity model. For example, the visual media data may include a script for a movie, the image recognizer 140 may implement the first cognitive learning operation to identify parts of the script relevant for the human face in the face identity model and tag the same with respective portion from the script to determine the tagged identity model. In an example, the implement the first cognitive learning operation to identify parts of the script relevant for the object name in the face identity model and tag the same with respective portion from the script to determine the tagged identity model. In an example, the visual media data may be an audio channel associated with the video clip. The image recognizer 140 may implement the first cognitive learning operation to analyze the audio channel and tag the face identity model with relevant sections of the audio channel to determine the tagged identity model. The first cognitive learning operation may deploy any of the Natural Language Processing (NLP) techniques for analyzing the audio channel. The NLP may refer to a set of applications of computational techniques to the analysis and synthesis of natural language and speech. In an example, the system 110 may associate the face identity model with multiple categories of the visual media data, for example, an audio channel, a script, a screenplay and the like to determine the tagged identity model.

The cognitive tracker 150 may be coupled to the processor 120. The cognitive tracker 150 may implement a second cognitive learning operation (explained in detail by way of FIG. 2) to determine whether the tagged face identity model for the human face is corroborating with the visual media feature map across the plurality of frames. As mentioned above and would be explained in detail by way of subsequent Figs., the system 110 would validate the tagged face identity model across the video clip for ensuring that for every visual data feature map the human face identity present in the tagged face identity model must include the same object name throughout the media clip. In an example, the visual media data may include an audio channel, which may be analyzed for determining the tagged face identity model. In such an example, the system 110 would validate the tagged face identity model across the video clip for ensuring that the audio channel is analyzed accurately for every visual data feature map wherein a particular human face identity may be present. The cognitive tracker 150 may validate the tagged face identity model across the video clip for ensuring accuracy.

The cognitive tracker 150 may implement the second cognitive learning operation to assemble a first frame from the plurality of frames of the video clip with an appurtenant tagged face identity model. The appurtenant tagged face identity model may refer to a tagged face identity model, which may be relevant for video tagging a particular character present in the video clip based on facial features of the character. In an example, the appurtenant tagged face identity model may be relevant for video tagging a particular character present in the video clip based on at least one object associated with the character. The cognitive tracker 150 may implement the second cognitive learning operation to assemble a second frame from the plurality of frames of the video clip with the appurtenant tagged face identity model of the first frame, wherein the second frame precedes the first frame in the video clip. In an example, a human face may be partially or completely occluded from a view in a frame from the plurality of frames of the video clip. The same human face may be visible in a subsequent a frame from the plurality of frames of the video clip. The image recognizer 140 may determine the tagged face identity model for that same human face, when it might be visible in any one of the frames. The cognitive tracker 150 may track the entire video clip including any frame from the plurality of frames which may be preceding the frame that may be used to determine the tagged face identity model. The cognitive tracker 150 would apply the tagged face identity model over all such preceding frames as well.

The cognitive tracker 150 may implement the second cognitive learning operation for determining an appurtenance index to indicate an accuracy level for application of the tagged face identity model to a particular frame. The appurtenance index may indicate a level of accuracy for video tagging for a particular character present in the video clip when facial features of the character may be temporarily occluded. As mentioned above, the cognitive tracker 150 may track the entire video clip including any frame from the plurality of frames, which may be preceding the frame that may be used to determine the tagged face identity model. The cognitive tracker 150 would apply the tagged face identity model over all such preceding frames as well, wherein the human face indicated by the tagged face identity model may be partially or completely occluded from a view. In such an example, the cognitive tracker 150 may determine the appurtenance index for indicating the accuracy level for application of the tagged face identity model to that particular frame.

The cognitive tracker 150 may implement the second cognitive learning operation for facilitating the application of the tagged face identity model to a frame from the plurality of frames wherein a human face is occluded from a view and the object name pertinent to the human face is visible in the frame. In such an example, the system 110 may implement the second cognitive learning operation for facilitating the application of the tagged face identity model to an occluded human face based on recognition of the object name pertinent to the human face The second cognitive learning operation may transfer known objects or events from other frames to the current frame with low confidence. In an example, the appurtenance index determined for a particular frame may be below a threshold value, which may be pre-defined for the system 110. The cognitive tracker 150 would apply the appurtenant tagged face identity model to that particular frame, with a low confidence and would indicate the same to a user of the system 110. The cognitive tracker 150 may generate an object detection result corresponding to the object detection requirement. The object detection result may include the video clip including the application of the appurtenant tagged face identity model across the plurality of frames of the video clip.

Accordingly, the system 110 may be used for effectively recognizing various characters in a video clip and tag the same with appropriate information. The system 110 may be efficient, accurate, and/or scalable. There system 110 may be a real-time intelligent character recognition system that may account for the various factors mentioned above amongst others to generate a unique identity for each character and object despite the individual being temporarily occluded from a view in a video clip. The system 110 may be a video cognition tool for character and object recognition, character and object action recognition, and the character and object motion recognition.

Figure 2:
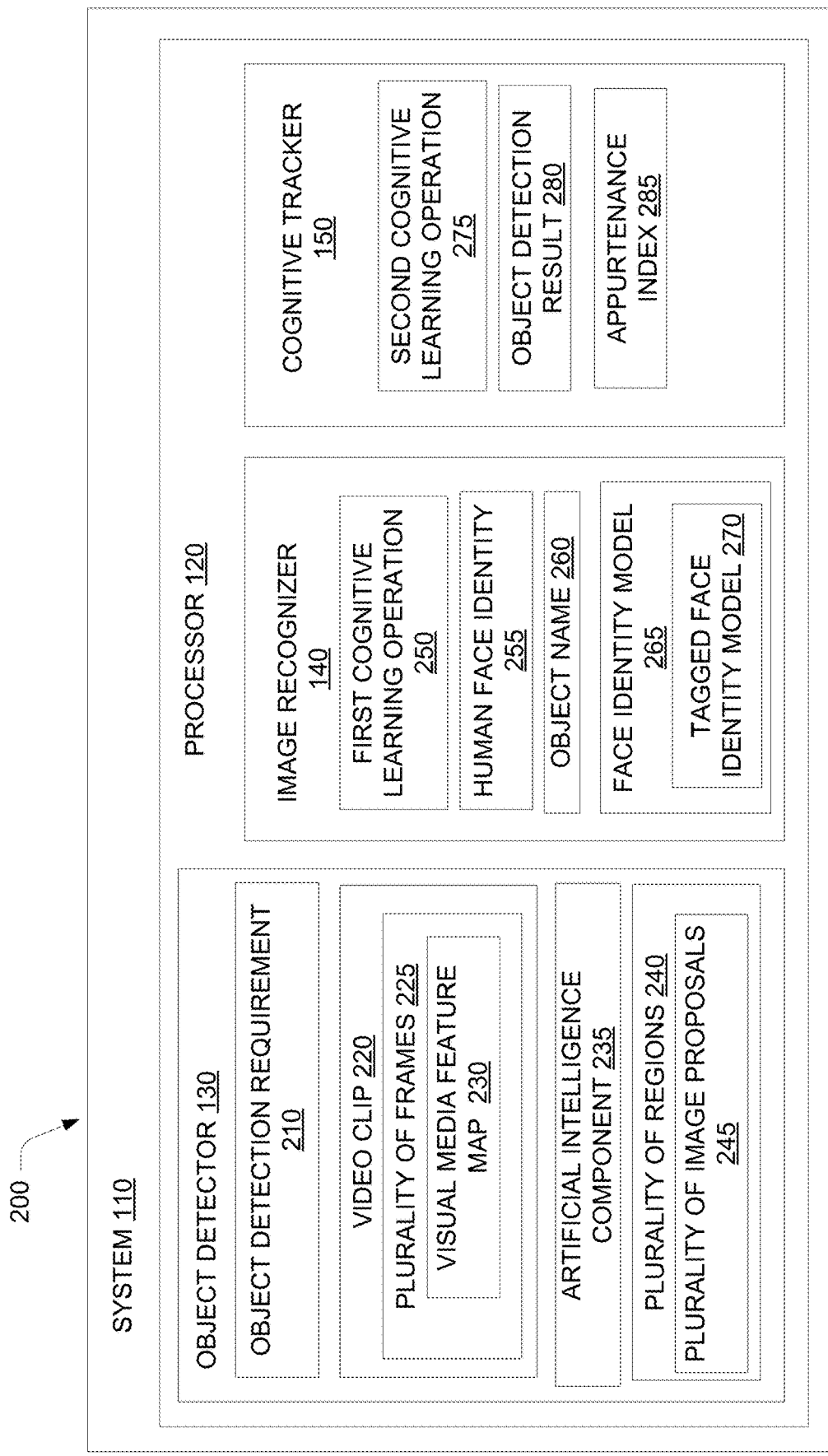
FIG. 2 illustrates various components of the system for character recognition, according to an example embodiment of the present disclosure.

FIG. 2 illustrates various components of the character recognition system 110, according to an example embodiment of the present disclosure. In an example, the system 110 may include a processor 120. The processor 120 may be coupled to the object detector 130, the image recognizer 140 and the cognitive tracker 150.

In accordance with an embodiment of the present disclosure, the object detector 130 may be configured to receive an object detection requirement 210 from a user. The object detection requirement 210 may pertain to a video clip 220. The object detection requirement 210 may refer to identifying, recognizing and tracking an object within the video clip 220. In an example, the object may be a character associated with the video clip 220. In an example, the object may refer to a product, which may be present in the video clip 220. For example, the object detection requirement 210 may pertain to a requirement for detection of various characters in a movie and video tagging the movie with character names, and character information for all frames of the video clip 220. In an example, the video clip 220 is to further comprise a real-time moving visual media. In accordance with an exemplary embodiment of the present disclosure, the object detection requirement 210 may pertain to detecting and recognizing various characters in a movie or a TV series. In an example, the object detection requirement 210 may pertain to recognizing various players involved in a sports event. The object detection requirement 210 may pertain to recognition and placement of various products in a video clip 220, for example, a user might want to check a number of times a particular product from a specific brand has been used in a video clip 220. The embodiments for the object detection requirements 210 presented herein are exemplary in nature and should be treated as such. For the sake of brevity and technical clarity, the description of the character recognition system may be restricted to few exemplary embodiments, however, to a person skilled in the art it should be clear that the character recognition system (system 110) may be used for fulfillment of various forecasting requirements other than those mentioned hereinafter.

The object detector 130 may identify a visual media feature map 230 from visual media data to process the object detection requirement 210. The visual media data may be obtained from a plurality of frames 225 associated with the video clip 220. The plurality of frames 225 may include various still images which compose the complete video clip 220. The visual media data may further comprise an image of a character, an image of an object, a name of the character, a label for the object, and an audio channel. The visual media feature map 230 may include a measurable factor or an attribute, which may be forming one of a set that may define a condition for processing the object detection requirement 210. In an example, the visual media feature map 230 may include multiple measurable factors that would have an impact on the purpose of the object detection requirement 210. For example, the purpose of the forecasting may be to detect, recognize and track various characters present in a video clip 220 pertaining to a movie. The object detector 130 may search through the visual media data and identify measurable factors, which may have an impact on the various characters present in a video clip 220. For example, the object detector 130 may identify different characters, which may be present in the video clip 220. The object detector 130 may access the visual media data for identifying various categories, which may be used for identification and classification of various features associated with each of the characters. The object detector 130 may identify a unique feature associated with each character within a video clip 220. For example, a number printed on the uniform of a player engaged in a sports event or a particular type of apparel, which may always be worn only by a particular character within the video clip 220. In an example, the unique feature may be a product, which a character may always hold within the video clip 220. In an example, a unique feature may be a particular audio channel which may always be associated with a particular character. Further, the object detector 130 may identify other measurable factors (not mentioned herein), which may be relevant for the processing the object detection requirement 210 of identifying, recognizing and tracking various characters present in a video clip 220 (explained further in detail with more exemplary embodiments by way of subsequent Figs.).

The object detector 130 may implement an artificial intelligence component 235 to augment the visual media feature map 230 by retrieving an ancillary data set associated with the video clip 220 from a plurality of sources. In accordance with an embodiment of the present disclosure, the plurality of data sources may include various data channels associated with the video clip 220. The ancillary data associated with the video clip 220 may include an audio channel, a screenplay, a script for the video clip 220. In an example, the ancillary data set may be retrieved from an external source, which may be associated with the video clip 220, but not embedded therein. For example, in a video clip 220 pertaining to a sports event, the ancillary data set may include data retrieved from an associated commentary. In an example, the video clip 220 may be a movie and the ancillary data set may be retrieved from a screenplay or a movie script, which may be provided by a production team of the movie. The visual media feature map 230 may segregate the video clip 220 into various categories based on visual features for each character.

Additionally, the object detector 130 may implement the artificial intelligence component 235 to segment the visual media feature map 230 into a plurality of regions 240. In accordance with an embodiment of the present invention, each of the plurality of regions 240 may indicate a particular part of a frame from the plurality of frames 225, which compose the video clip 220. Each region from the plurality of regions 240 may include a conglomerate of various characters and objects sorted from the visual media feature map 230 through the implementation of the artificial intelligence component 235. Further, the object detector 130 may implement the artificial intelligence component 235 to identify a plurality of image proposals 245 from each of the plurality of regions 240. As mentioned above, each region from the plurality of regions 240 may include a conglomerate of various characters and objects. The artificial intelligence component 235 may be implemented to generate possible images pertaining to a human or an object from the plurality of regions 240. The possible images so generated may be referred to as the plurality of image proposals 245. In an example, the plurality of image proposals 245 may include an image proposal, which may be identified by the system 110 as a possible character within the video clip 220. In an example, the image proposal may include a human face. In an example, the image proposal may include a particular object of interest, which may be indicated by a user through the object detection requirement 210. Each of the plurality of image proposals 245 may be considered by the system for performing tasks of image recognition and image tracking. In an example, the plurality of sources used for augmenting the visual media feature map 230 may include an audio clip associated with the video clip 220, and a dataset associated with the human face identity for the human face present in the plurality of image proposals 245.

The artificial intelligence component 235 may include a deep learning system. In an example, the deep learning system may be an end-to-end deep learning system. The end-to-end deep learning system may be configured for simultaneous identification of multiple characters and objects between consecutive frames from the plurality of frames 225 under challenging scenarios. In an example, as mentioned above, the challenging scenarios may refer to situations when a character may be temporarily occluded from a view within the video clip 220. In an example, the occlusion may be partial or complete. The artificial intelligence component 235 may deploy object detection deep model to detect multiple objects. In an example, the object detection deep model may include a Convolutional Neural Network (CNN), a Region Proposal Network (RPN), and an Evaluation Network (EN). The CNN may cut the video clip 220 into the plurality of frames 225 so that each of the frames from the video clip 220 may pass to the deep convolution network to get the visual media feature map 230. The system 110 may pass the visual media feature map 230 through the RPN. The RPN generates the plurality of image proposals 245. In an example, the image proposal may be a set of bounding boxes (also referred to as region proposals) of different size and predicts the probability of each bounding box being background or foreground. The RPN may include a classifier a regressor, and an anchor. The Classifier may determine the probability of an image proposal having a target object. The Regressor may regress the coordinates of the image proposal as per pre-defined parameters like a scale of an image and an aspect ratio. The EN may be a training model, which may be comprising the plurality of image proposals 245 and a set of ground truth boxes. In an example, the network may apply a non-max suppression to only keep the most confident of the image proposals and remove everything else that may have an intersection of union (IOU) of less than 0.6 between a proposed plurality of image proposals 245 and a set of ground truth boxes. The ground truth boxes may refer to the accuracy of the training set's classification for supervised learning techniques. Various other AI tools (not mentioned herein) may be implemented by the object detector 130 for detection of various images within each frame of the video clip 220.

The image recognizer 140 may be coupled to the processor 120. The image recognizer 140 may implement a first cognitive learning operation 250 to allocate a human face identity 255 for a human face present in the plurality of image proposals 245. As mentioned above the system 110 may generate the plurality of image proposals 245 over each frame from the plurality of frames 225. The image recognizer 140 may implement the first cognitive learning operation 250 and recognize a person in the image and generate a human identity for each human face present in each of the plurality of image proposals 245 (explained in detail by way of subsequent Figs.). The image recognizer 140 may further implement the first cognitive learning operation 250 to allocate an object name 260 for an object present in the plurality of image proposals 245. Additionally, the image recognizer 140 may implement the first cognitive learning operation 250 to recognize various objects with the plurality of image proposals 245. The image recognizer 140 may allocate the object name 260 for each object. The image recognizer 140 may implement the first cognitive learning operation 250 to determine a face identity model 265 for the human face present in the plurality of image proposals 245. The face identity model 265 may include the human face identity 255 and the object name 260 pertinent to the human face identity 255. The face identity model 265 may be used by the system 110 for tracking a particular human face across the video clip 220 (as explained by way of subsequent paragraphs). The face identity model 265 may be a data set wherein each human face identified would include a set of the object names 260, which may be detected, and identified in the vicinity of the human face. In an example, the face identity model 265 may include multiple objects detected and identified in the vicinity of the human face. The system 110 may be configured such as to include all the objects detected and identified in the vicinity of the human face into face identity model 265.

The image recognizer 140 may implement the first cognitive learning operation 250 to associate the face identity model 265 for the human face with the pertinent object name 260 and the visual media data for generating a tagged face identity model 270. As mentioned above, the face identity model 265 may include the human face identity 255 and all the object names 260 identified in the vicinity of the human face. The system 110 may identify the object names 260, which may be pertinent to the human face identity 255 across the plurality of frames 225 in the video clip 220. For example, there may be an object like a lamp detected in the vicinity of a human face, although the lamp may not always be present in the vicinity of the same human face across the video clip 220. The image recognizer 140 may implement the first cognitive learning operation 250 to identify such objects and sanitize the face identity model 265 to include the human face identity 255 and the object names 260 pertinent to the human face identity 255. Further, the image recognizer 140 may implement the first cognitive learning operation 250 to analyze the visual media data and associate the same with the sanitized face identity model 265. For example, the visual media data may include a script for a movie, the image recognizer 140 may implement the first cognitive learning operation 250 to identify parts of the script relevant for the human face in the face identity model 265 and tag the same with respective portion from the script to determine the tagged identity model. In an example, the implement the first cognitive learning operation 250 to identify parts of the script relevant for the object name 260 in the face identity model 265 and tag the same with respective portion from the script to determine the tagged identity model. In an example, the visual media data may be an audio channel associated with the video clip 220. The image recognizer 140 may implement the first cognitive learning operation 250 to analyze the audio channel and tag the face identity model 265 with relevant sections of the audio channel to determine the tagged identity model. The first cognitive learning operation 250 may deploy any of the Natural Language Processing (NLP) techniques for analysing the audio channel. The NLP may refer to a set of applications of computational techniques to the analysis and synthesis of natural language and speech. In an example, the system 110 may associate the face identity model 265 with multiple categories of the visual media data, for example, an audio channel, a script, a screen play and the like to determine the tagged identity model.

The first cognitive learning operation 250 may include character recognition deep model for recognition of human faces and various objects with the plurality of image proposals 245. The character recognition deep model may include a face detection module and a face recognition module. In an example, the first cognitive learning operation 250 may be implemented over the plurality of image proposals 245 identified by the object detector 130 through the implementation of the artificial intelligence component 235. The face detection module may detect all faces within the image proposal. The face detection module may consist of a convolutional neural network, with a set of convolution, pooling and activation layers. In the Convolution layer, a sliding window of 5×5 size may pass through the plurality of frames 225 and facilitate the generation of the visual data feature map. The pooling layer may down samples the feature maps and the activation layer may perform the normalization. The face recognition module may be based on residual neural network architecture (ResNet). In this network, convolution, pooling and activation layers may facilitate in the generation of the visual data feature maps. In an example, fully connected layer maps input features as 128-dimensional embedding. A Soft max layer may generate a probability score and, finally, a recognition may be performed by generating similarity scores based on unique facial features and comparing with an enrolled database. In an example, the enrolled database may refer to character data collected by the system 110 across the plurality of frames 225. In an example, the character data may include the face identity model 265 for each of the human faces identified for the video clip 220. Various other AI tools (not mentioned herein) may be implemented by the image recognizer 140 for recognition of various images within each frame of the video clip 220.

The cognitive tracker 150 may be coupled to the processor 120. The cognitive tracker 150 may implement a second cognitive learning operation 275 to determine whether the tagged face identity model 270 for the human face is corroborating with the visual media feature map 230 across the plurality of frames 225. As mentioned above and would be explained in detail by way of subsequent Figs., the system 110 would validate the tagged face identity model 270 across the video clip 220 for ensuring that for every visual data feature map the human face identity 255 present in the tagged face identity model 270 must include the same object name 260 throughout the media clip. In an example, the visual media data may include an audio channel, which may be analyzed for determining the tagged face identity model 270. In such an example, the system 110 would validate the tagged face identity model 270 across the video clip 220 for ensuring that the audio channel is analyzed accurately for every visual data feature map wherein a particular human face identity 255 may be present. The cognitive tracker 150 may validate the tagged face identity model 270 across the video clip 220 for ensuring accuracy.

The cognitive tracker 150 may implement the second cognitive learning operation 275 to assemble a first frame from the plurality of frames 225 of the video clip 220 with an appurtenant tagged face identity model 270. The appurtenant tagged face identity model 270 may refer to a tagged face identity model 270, which may be relevant for video tagging a particular character present in the video clip 220 based on facial features of the character. In an example, the appurtenant tagged face identity model 270 may be relevant for video tagging a particular character present in the video clip 220 based on at least one object associated with the character. The cognitive tracker 150 may implement the second cognitive learning operation 275 to assemble a second frame from the plurality of frames 225 of the video clip 220 with the appurtenant tagged face identity model 270 of the first frame, wherein the second frame precedes the first frame in the video clip 220. In an example, a human face may be partially or completely occluded from a view in a frame from the plurality of frames 225 of the video clip 220. The same human face may be visible in a subsequent a frame from the plurality of frames 225 of the video clip 220. The image recognizer 140 may determine the tagged face identity model 270 for that same human face when it might be visible in any one of the frames. The cognitive tracker 150 may track the entire video clip 220 including any frame from the plurality of frames 225 which may be preceding the frame that may be used to determine the tagged face identity model 270. The cognitive tracker 150 would apply the tagged face identity model 270 over other such preceding frames as well.

The cognitive tracker 150 may implement the second cognitive learning operation 275 for determining an appurtenance index 285 to indicate an accuracy level for application of the tagged face identity model 270 to a particular frame. The appurtenance index 285 may indicate a level of accuracy for video tagging for a particular character present in the video clip 220 when facial features of the character may be temporarily occluded. As mentioned above, the cognitive tracker 150 may track the entire video clip 220 including any frame from the plurality of frames 225 which may be preceding the frame that may be used to determine the tagged face identity model 270. The cognitive tracker 150 would apply the tagged face identity model 270 over other such preceding frames as well, wherein the human face indicated by the tagged face identity model 270 may be partially or completely occluded from a view. In such an example, the cognitive tracker 150 may determine the appurtenance index 285 for indicating the accuracy level for application of the tagged face identity model 270 to that particular frame.

The cognitive tracker 150 may implement the second cognitive learning operation 275 for facilitating the application of the tagged face identity model 270 to a frame from the plurality of frames 225 wherein a human face is occluded from a view and the object name 260 pertinent to the human face is visible in the frame. The second cognitive learning operation 275 may transfer known objects or events from other frames to the current frame with low confidence. In an example, the appurtenance index 285 determined for a particular frame may be below a threshold value, which may be pre-defined for the system 110. The cognitive tracker 150 would apply the appurtenant tagged face identity model 270 to that particular frame, with low confidence and would indicate the same to a user of the system 110. The cognitive tracker 150 may generate an object detection result 280 corresponding to the object detection requirement 210. The object detection result 280 may include the video clip 220 including the application of the appurtenant tagged face identity model 270 across the plurality of frames 225 of the video clip 220.

The second cognitive learning operation 275 may deploy deep learning over image sequences (3D) as opposed to recognition on individual frames (2D) to take advantage of the temporal aspect of the video. The second cognitive learning operation 275 may include a detection module, a recognition module, an ensemble module, a tracking module, a point-in-time detection, and a recognition module. The Detection module may detect all the objects and faces with associated image proposal or bounding box locations in the plurality of frames 225. The Recognition module may facilitate the generation of visual data feature map and may tag each of the image proposals or bounding box with a set of labels. The ensemble module may integrate output from the detection module and the recognition module outputs as seeds for tracking. In an example, the output may include the tagged face identity model 270. The tracking module may track each of the human faces and objects for which the tagged face identity model 270 may have been generated across consecutive frames. The Point-in-time detection and recognition module may be paired with a forward-backward tracking approach to continuously identify character and objects throughout long and short-term occlusions for causal and non-causal events.

In accordance with an embodiment of the present invention, system 110 may be configured so that the any of the artificial intelligence component 235, the first cognitive learning operation 250, and the second cognitive learning operation 275 may be implemented using various AI tools (not mentioned herein) for processing the object detection requirement 210. In an example, the system 110 may implement the artificial intelligence component 235, the first cognitive learning operation 250, and the second cognitive learning operation 275 to tightly couple recognition and tracking of human faces and objects. As mentioned above, the system 110 may associate the face identity model 265 for the human face with the pertinent object name 260 and the visual media data for generating a tagged face identity model 270. In an example, 3D convolutional neural networks (CNN) may be applied to solve the simultaneous recognition and tracking problem in a sequence of frames. The 3D CNN may extract spatiotemporal patterns of a specific face or object, and then use them to generate the visual data feature map and identify the plurality of image proposals 245 (bounding box and trajectory) therein. The 3D CNN may convolve a 3D kernel to a 3D image cube that may be generated by stacking several contiguous frames. By using this construction, the visual data feature map may obtain the information of the contiguous frames of previous layers and the thus may capture the temporal information. The basic structure of 3D CNN may include an input layer, a 3D convolution layer, a 3D pooling layer, and a fully connection layer.

In an example, the input layer may be composed of a normalized video clip 220 in spatial and temporal dimensions. The dimension of the video clip 220 may be represented as a "c×f×h×w", where c may be a number of channels of the video clip 220, f may be a number of frames of the video clip 220 (also referred to as a number of the plurality of frames 225 within the video clip 220), and d and k may be the height and width of each frame image. The convolutional layers may be represented as C(d, k, k). These layers may extract features of the upper layer by several 3D convolution kernels with d and k as a temporal and spatial dimension, respectively. A convolutional value may be computed by convolving local receptive field k×k of continuous frames with input visual data feature map. The output of these layers may be passed through a leaky rectified non-linearity unit (ReLU). The pooling layers may be represented as P (m, n). These layers may reduce the computational complexity and avoid the possibility of over-fitting. A pooling value may be computed by substituting m×m×n kernel for maximum or average. In the conventional CNN model, in order to learn more abstract temporal and spatial features, convolutional layers and pooling layers may appear alternately, which may constitute the deep CNN model. The fully connected layer may be represented as FC(c). Each unit (each of the plurality of regions 240) of visual data feature maps in the upper layer may be connected with c units of the fully connected layer. The fully connected layer may be followed by an output layer. The number of outputs may correspond to the number of class labels and a softmax nonlinearity may be used to provide a probabilistic output.

In operation, the system may deploy the object detector 130 for detecting content, which could be seen in the video clip 220. For example, if the video clip 220 may be pertaining to a horse rider riding a horse, the system 110 may deploy the object detector 130 for identifying the horse rider and the horse across various frame from the plurality of frames 225 from the video clip 220. The system 110 may deploy the image recognizer 140 to classify various sequences of frames from the plurality of frames 225 for recognizing motion of characters and objects. The system 110 may deploy the cognitive tracker 150 for tracking similar characters and objects across various frames. The system 110 may constantly test and validate the objects and when a content of the video clip 220 shifts through development of the appurtenance index 285. When the content of the video clip 220 shifts the appurtenance index 285 drops considerably and the system 110 may initiate detection, recognition and tracking of new objects and characters. The system 110 may be used to filter inappropriate content from a movie or a television series. The system 110 may be used to insert appropriate advertising through detection, recognizing and tracking placement of various products across the video clip, for example, a soft drink can from a particular company being visible in a movie or television series. The system 110 may generate and amalgamate various symbol and text libraries, image recognition, audio analysis, and human annotation for character and object recognition across the video clip 220.

The system 110 may provide for the best outcome of a video tagging process and facilitate in making the tedious task of compiling character and object recognition intelligence more effective. Furthermore, the system 110 may then analyze various categories of data in a video clip, based on the various parameters to accurately interpret the data for effective processing of the object detection requirements.

Figure 3:
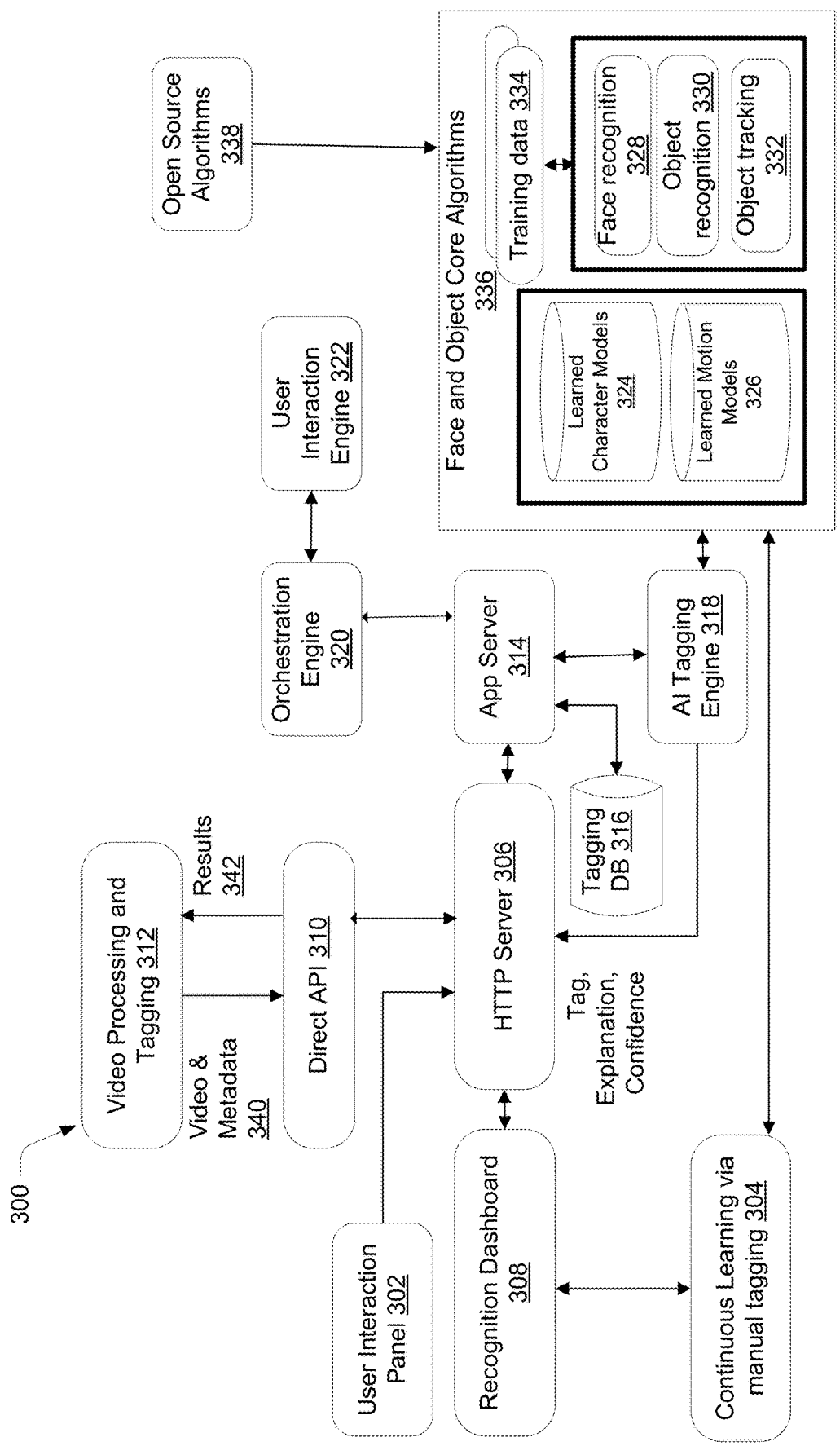
FIG. 3 illustrates key areas of a system for character recognition, according to an example embodiment of the present disclosure.

FIG. 3 illustrates key areas of the architecture of a character recognition system 300, according to an example embodiment of the present disclosure. All the components of the system 110 as described by way of FIG. 1 and FIG. 2 may be applicable for the system 300. For the sake of brevity and technical clarity, the explanation of the various components of the system 110 as provided by FIG. 1. and FIG. 2 may be not repeated for an explanation of the system 300. In accordance with various embodiments of the present disclosure, the system 300 may be the same as the system 110.

The system 300 may include a user interaction panel 302. The user interaction panel 302. The user interaction panel 302 may be used by a user of the system 300 for sending the object detection requirement 210 to the system 300. In an example, the user interaction panel 302 may be used by a user of the system 300 for viewing the appurtenance index 285. The user interaction panel 302 may be in communication with a manual tagging module 304 and a server 306. The manual tagging module 304 may be deployed for providing and receiving a user feedback and annotation for a manual video tagging process. In an example, the system 300 may assemble a first frame from the plurality of frames 225 of the video clip 220 with the appurtenant tagged face identity model 270. The system 110 may communicate the appurtenance index 285 of the tagged face identity model 270 to the user of the system through the user interaction panel 302. The user may manually annotate the application of the tagged face identity model 270 to the plurality of the frames 225. The user may communicate the results of the manual annotation to the user interaction panel 302. The user interaction panel 302 may communicate the results of the manual annotation with the manual tagging module 304 for making the system 110 a self-learning and updating system. The manual tagging module 304 may be in communication with a face and object core algorithm module 336. The face and object core algorithm module 336 may comprise the artificial intelligent component 235, the first cognitive learning operation 250, and the second cognitive learning operation 275.

As mentioned above, the user interaction panel 302 may be in communication with the server 306. The server 306 may be a HyperText Transfer Protocol (HTTP) server. The server 306 may comprise the content located in the server, this includes Hypertext Markup Language (HTML), images, flash, and any file related. The server 306 may not be restricted to server static content, it may also serve dynamic content generated on the fly from a database and the like. The server 306 may be in communication with a recognition dashboard 308, a direct API 310, an application server 314, and an AI tagging engine 318. The recognition dashboard 308 may implement the artificial intelligence component 235 to detect and recognize content stored in the server 306. The direct API 310 may communicate with a video processing and tagging module 312. The video processing and tagging module 312 may process a content 340 and generate a result 342. In an example, the content 340 may be a video or a metadata content.

The application server 314 may be in communication with a tagging database 316 and the AI tagging engine 318. In accordance with an embodiment of the present disclosure, the AI tagging engine 318 may receive information about the tagged face identity model 270 from the face and object core algorithm module 336. The AI tagging engine 318 may send the information about the tagged face identity model 270 to the application server 314. In an example, the application server 314 send information about the tagged face identity model 270 from the tagging database 316. The tagging database 316 may store the information about the tagged face identity model 270 and in an example, the application server 314 may receive the information about the tagged face identity model 270 from the tagging database 316. Further, the application server 314 may be in communication with an orchestration engine 320. The orchestration engine 320 may be configured for a process of application orchestration. The application orchestration process may refer to a process of integrating two or more applications and/or services together to automate a process or synchronize data in real-time. The orchestration engine 320 may be in communication with a user interaction engine 322. The user interaction engine 322 may be used by a user of the system 300 for any other interaction with the system 300, for example, to view the object detection result 280. In an example, user interaction engine 322 may facilitate a user of the system in viewing the appurtenance index 285 for a particular frame which may be accompanying the object detection result 280 for a particular frame from the plurality of frames 225. In an example, the user interaction engine 322 may be configured so that the appurtenance index 285 visible to the user may be updated for corresponding frames from the plurality of frames 225 of the video clip 220.

As mentioned above, the server 306 may be in communication with the AI tagging engine 318. The AI tagging engine 318 may be in communication with the face and object core algorithm module 336. The AI tagging engine 318 may facilitate in tagging the content stored in the server 306. In an example, the AI tagging engine 318 may facilitate in developing the appurtenance index 285 for the content stored in the server 306. In an example, the server 306, the applications server 314, and the AI tagging engine 318 connected to each other for receiving information from the face and object core algorithm module 336, apply the tagged face identity model 270 to the content of the server 306 and generating the appurtenance index 285 for every tagged face identity model 270. The communication between the server 306, the applications server 314, and the AI tagging engine 318 may enable the system to modify the appurtenance index 285 based on new content received. For example, as the frames from the plurality of frames 225 shift, while a video clip is being played, different characters may become visible and a frame background may change. The system 300 may be configured so that the appurtenance index 285 would be modified for the content shown in each frame from the plurality of frames 225 and the appurtenance index 285 would be visible to the user through the user interaction engine 322.

The face and object core algorithm module 336 may be in communication with various open source algorithms 338. The face and object core algorithm module 336 may include a training data module 334. The training data module 334 may be connected to a face recognition module 328, an object recognition module 330, and an object tracking module 332. In an example, each of the face recognition module 328, the object recognition module 330, and the object tracking module 332 may be in communication with a set of learned character models 324, and a set of learned motion models 326. As mentioned above, the artificial intelligence component 235, the first cognitive learning operation 250, and the second cognitive learning operation 275 may be used for detecting, identifying and tracking various objects and characters within the plurality of frames 225 of the video clip 220.

In an example, the set of learned character models 324 may be configured for detecting various characters and objects across consecutive frames from the plurality of frames 225. The set of learned character models 324 may be configured to interpret various characters and objects across consecutive frames from the plurality of frames 225. The set of learned character models 324 may be in communication with each of the face recognition module 328, the object recognition module 330, and the object tracking module 332. In an example, the set of learned motion models 326 may be configured for detecting motion of various characters and objects across consecutive frames from the plurality of frames 225. The set of learned motion models 326 may be configured to interpret the motion of various characters and objects across consecutive frames from the plurality of frames 225. The set of learned motion models 326 may be in communication with each of the face recognition module 328, the object recognition module 330, and the object tracking module 332.

In an example, the face recognition module 328, the object recognition module 330, the object tracking module 332, the set of learned character models 324, and the set of learned motion models 326 may operate in a synchronized manner to detect, identify and track an object or a character in the video clip 220 across the plurality of frames 225. For example, if a video clip 220 pertains to a horse rider riding on a horse. The face recognition module 328, the object recognition module 330, the object tracking module 332, the set of learned character models 324, and the set of learned motion models 326 may work in a synchronized manner to detect the horse, the horse rider, the running motion of the horse and the background change across the plurality of frames 225. The AI tagging engine 318 may generate the appurtenance index 285 for each of the horse, the horse rider and the background change across the plurality of frames 225. In an example, when video clip 220 may change the background of a character or an object, the system 110 may develop the appurtenance index 285 for the new background even when the object and character across the plurality of frames remain the same. Additionally, the system 110 may develop the appurtenance index 285 for every new object or character detected and display the same to the user.

FIG. 4A-4F illustrate a use case pictorial representation of a process 400 for objection detection, image recognition and cognitive tracking based on the character recognition system, according to an example embodiment of the present disclosure. All the components of the system 110 as described by way of FIG. 1 and FIG. 2 may be applicable for the process 400. For the sake of brevity and technical clarity, the explanation of the various components of the system 110 as provided by FIG. 1. and FIG. 2 may be not repeated for an explanation of the process 400. The process 400 may pertain to an embodiment of the present disclosure, wherein the system 110 may recognize various characters in the video clip 220.

FIG. 4A may include a frame 402. The frame 402 may be a frame from the plurality of frames 225. The frame 402 may indicate a time to be at a stage zero for indicating that the frame 402 may be a first frame for the process 400. The frame 402 may include a character 404, and a character 406. In the pictorial representation depicted by FIG. 4A, the character 406 may be partially occluded from a view and the character 404 may be completely occluded from a view. As mentioned above, the system 110 may implement the artificial intelligence component 235 to determine the plurality of image proposals 245 as indicated by a line 420 for the character 406 and a line 422 for the character 404. The system 110 may implement the artificial intelligence component 235, and the first cognitive learning operation 250 for identifying the character 406 as "Rey".

Figure 4B:
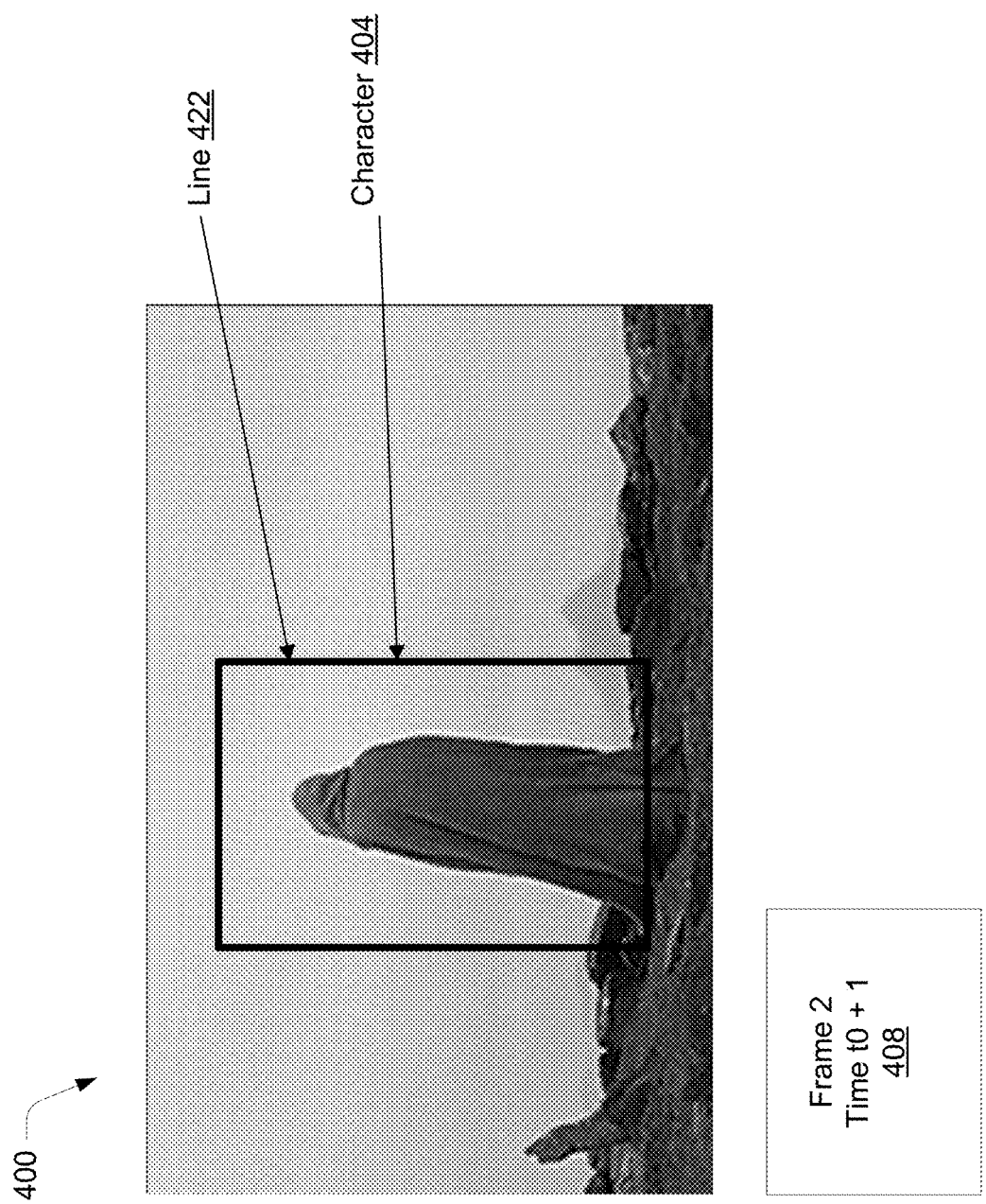

FIG. 4B may include a frame 408. The frame 408 may be a frame from the plurality of frames 225. The frame 408 may indicate a time to be at a stage zero plus one (0+1) for indicating that the frame 408 may be a second frame for the process 400. The frame 408 may include the character 404. The character 404 may be occluded from a view in the frame 408. As mentioned above, the system 110 may implement the artificial intelligence component 235 to determine the plurality of image proposals 245 as indicated the line 422 for the character 404.

Figure 4C:
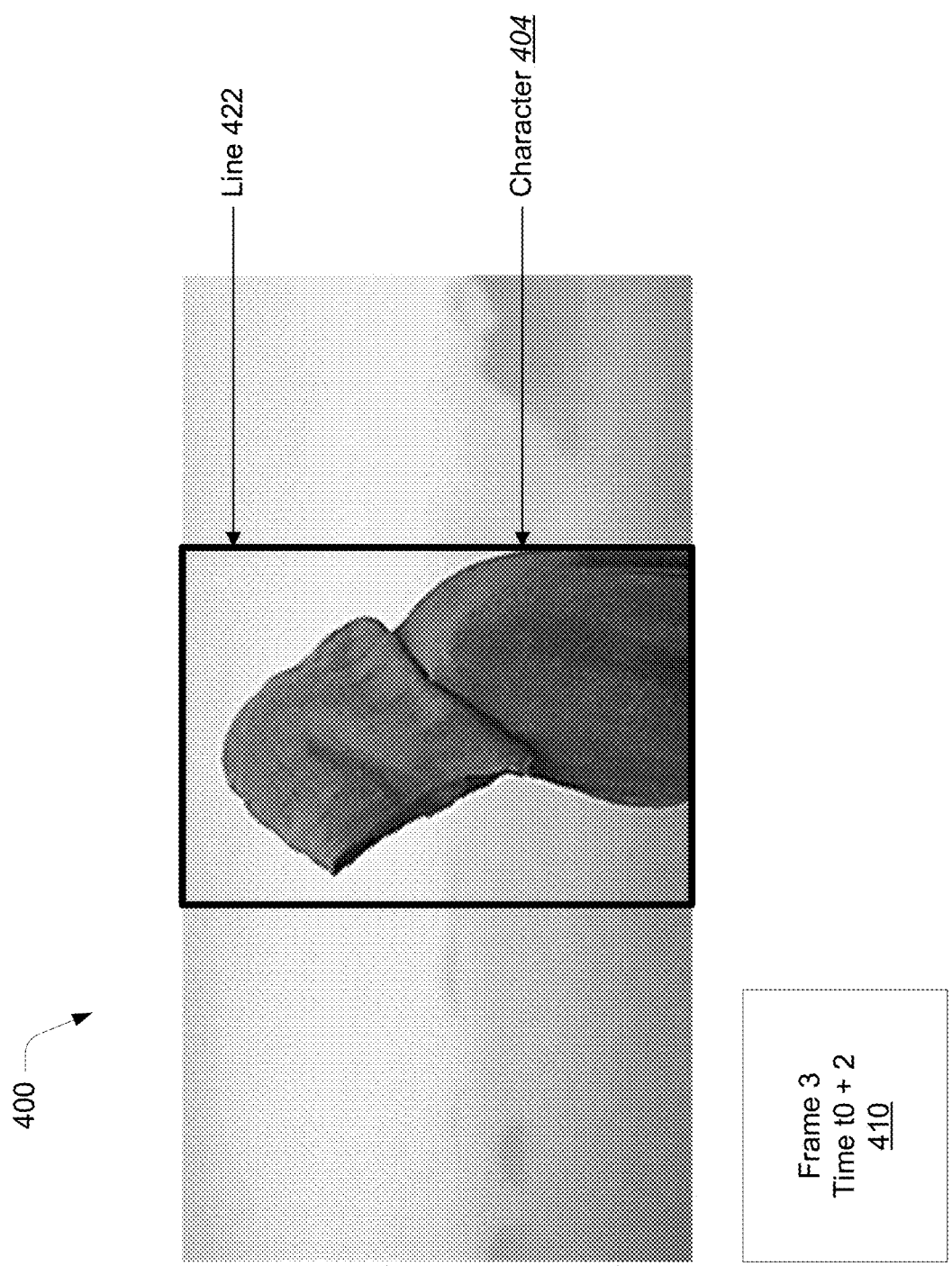

FIG. 4C may include a frame 410. The frame 410 may be a frame from the plurality of frames 225. The frame 410 may indicate a time to be at a stage zero plus two (0+2) for indicating that the frame 410 may be a third frame for the process 400. The frame 410 may include the character 404. The character 404 may be occluded from a view in the frame 410, and the frame 410 may be focused onto the character 404. As mentioned above, the system 110 may implement the artificial intelligence component 235 to determine the plurality of image proposals 245 as indicated the line 422 for the character 404.

Figure 4D:
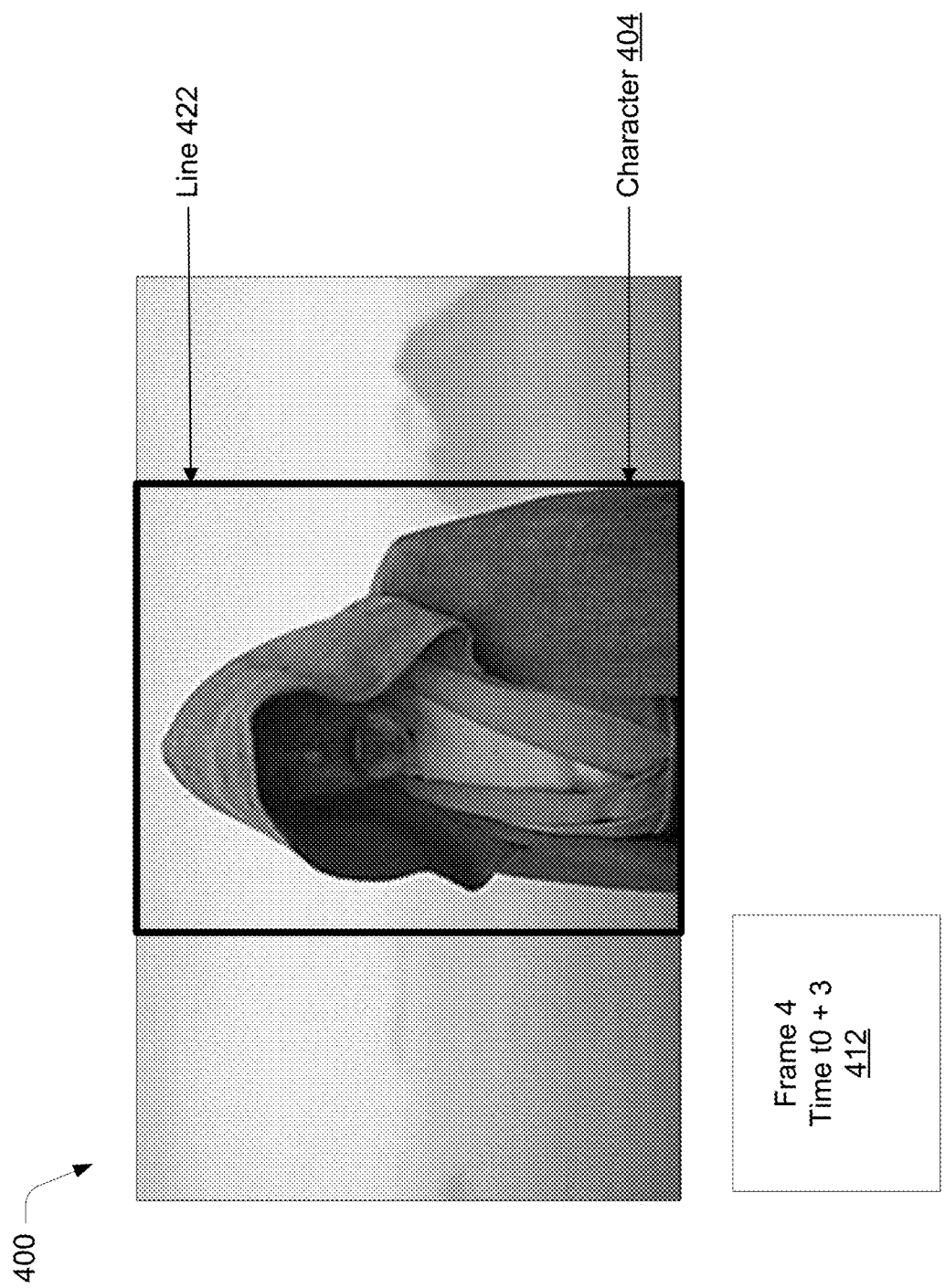

FIG. 4D may include a frame 412. The frame 412 may be a frame from the plurality of frames 225. The frame 412 may indicate a time to be at a stage zero plus three (0+3) for indicating that the frame 412 may be a fourth frame for the process 400. The frame 412 may include the character 404. The character 404 may be partially occluded from a view in the frame 412, and the frame 412 may be focused onto the character 404. As mentioned above, the system 110 may implement the artificial intelligence component 235 to determine the plurality of image proposals 245 as indicated the line 422 for the character 404.

Figure 4E:
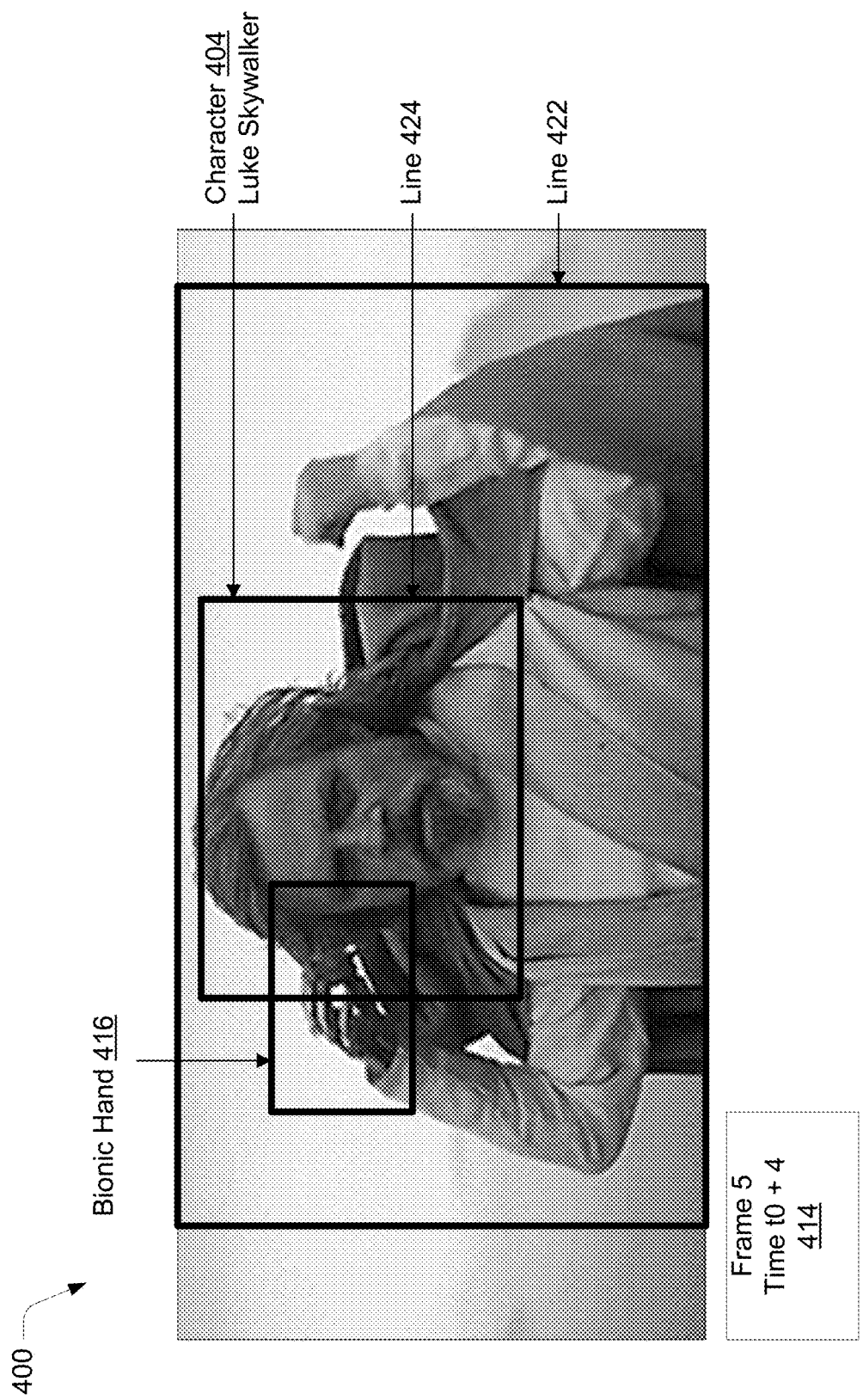

FIG. 4E may include a frame 414. The frame 414 may be a frame from the plurality of frames 225. The frame 412 may indicate a time to be at a stage zero plus four (0+4) for indicating that the frame 412 may be a fifth frame for the process 400. The frame 414 may include the character 404. The character 404 may be visible in the frame 412, and the frame 412 may be focused onto the character 404, and various objects associated with the person. As mentioned above, the system 110 may implement the artificial intelligence component 235 to determine the plurality of image proposals 245 as indicated the line 422 for the character 404, a line 424 for facial features of the character 404, and a bionic hand 416 for the character 404. As mentioned, above the system 110 may implement the first cognitive learning operation 250 for identifying the human face identity 255 for the character 404 as "Luke Skywalker" as soon as the person is visible in the frame 414. The system 110 may also identify the object name 260 pertinent to the human face identity 255 for the character 404 as the bionic hand 416. The system 110 may determine the face identity model 265 for the character 404 to include the object name 260 pertinent to the human face identity 255 for the character 404 as the bionic hand 416. The system may apply the first cognitive learning operation 250 to associate the face identity model 265 for the character 404 with visual media data for identifying the character 404 in the frame 414.

Figure 4F:
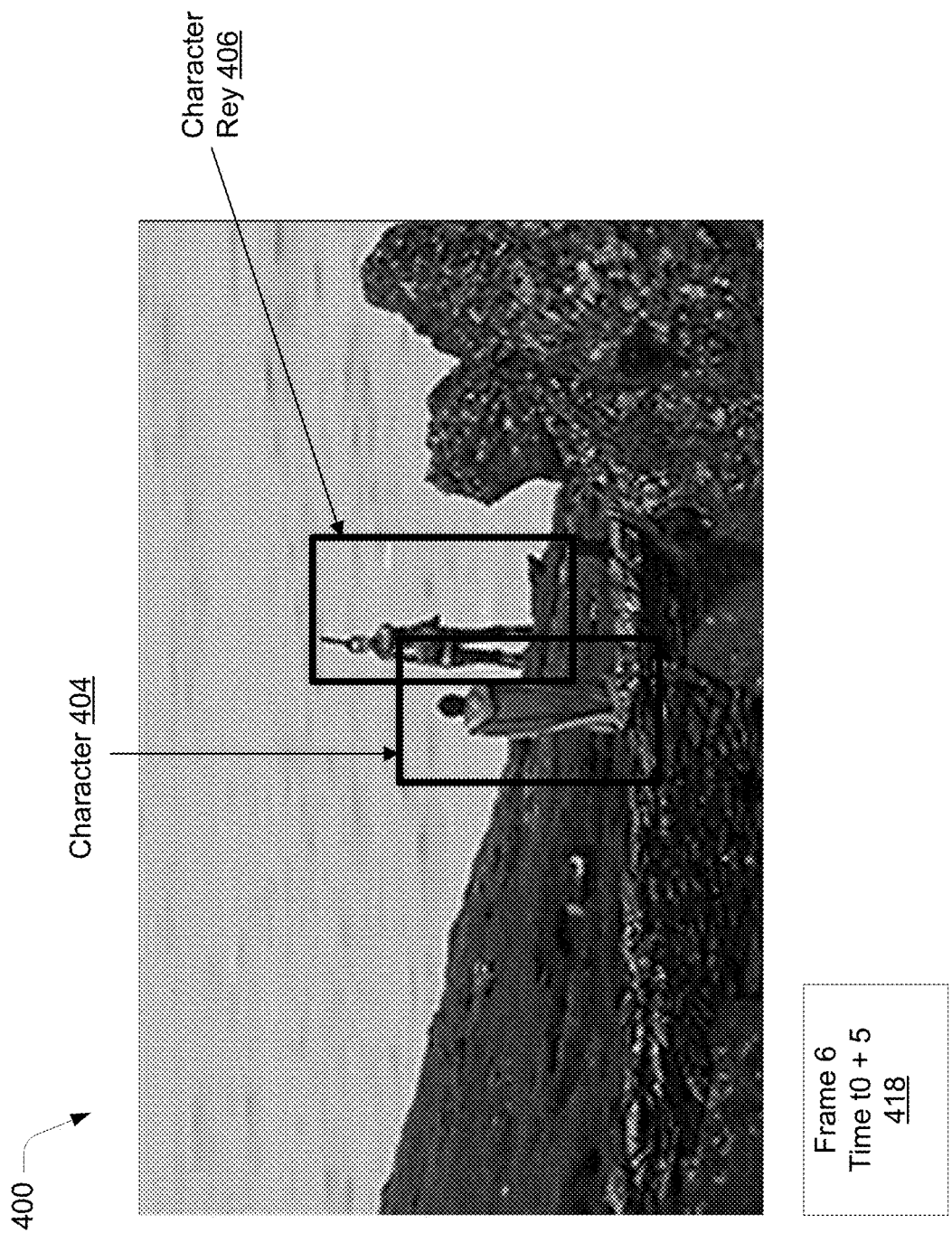

FIG. 4F may include a frame 418. The frame 418 may be a frame from the plurality of frames 225. The frame 418 may indicate a time to be at a stage zero plus five (0+5) for indicating that the frame 418 may be a sixth frame for the process 400. The frame 418 may include the character 404 (now referred to as the character 404 after identification), and the character 406. The character 404 may be partially occluded from a view in the frame 418, and the frame 418 may not be focused onto the character 404 and the character 406. As mentioned above, the system 110 may implement the artificial intelligence component 235, the first cognitive learning operation 250, and the second cognitive learning operation 275 to transfer the identity of the character 404 from the frame 414 to the frame 418 and the identity of the character 406 from the frame 402 to the frame 414. As mentioned above, the cognitive tracker 150 may implement the second cognitive learning operation 275 to assemble a second frame from the plurality of frames 225 of the video clip 220 with the appurtenant tagged face identity model 270 of the first frame, wherein the second frame precedes the first frame in the video clip 220. In an example, the process 400 may include the frame 414 to be the first frame, wherein the identity of a human face may be determined and any of the frame 402, 408, 410, and 412 to be the second frame.

FIG. 5A-5E illustrate a use case pictorial representation of a process 500 for objection detection, image recognition and cognitive tracking based on the character recognition system 110, according to an example embodiment of the present disclosure. All the components of the system 110 as described by way of FIG. 1 and FIG. 2 may be applicable for the process 500. Any of the process described for FIG. 4 may be applicable for the process 500. For the sake of brevity and technical clarity, the explanation of the various components of the system 110 as provided by FIG. 1., FIG. 2 and FIG. 4 may be not repeated for an explanation of the process 500. The process 500 may pertain to an embodiment of the present disclosure, wherein the system 110 may recognize various characters in the video clip 220.

Figure 5A:
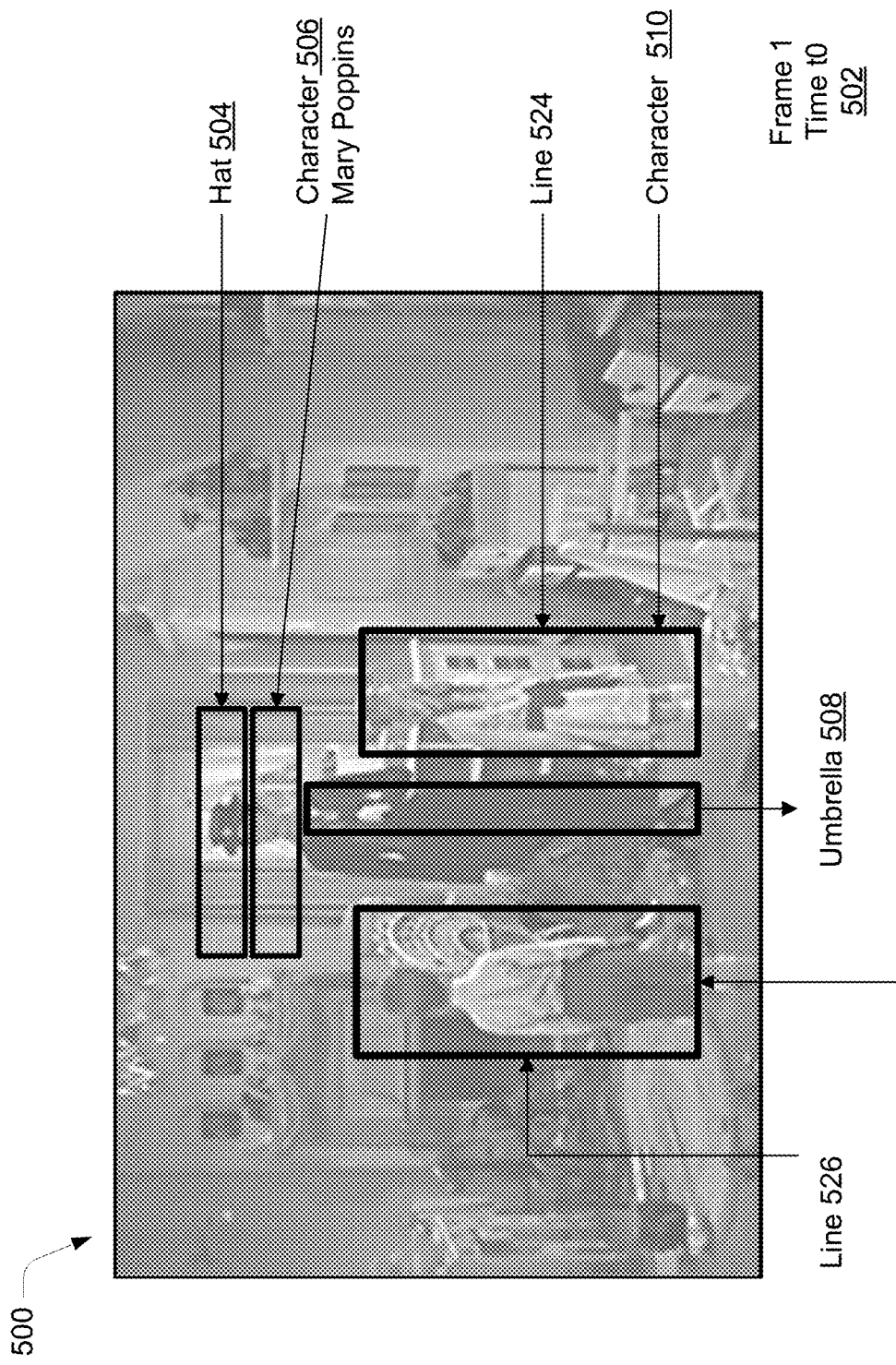

FIG. 5A may include a frame 502. The frame 502 may be a frame from the plurality of frames 225. The frame 502 may indicate a time to be at a stage zero for indicating that the frame 502 may be a first frame for the process 500. The system 110 may implement the artificial intelligence component 235, and the first cognitive learning operation 250 to identify a hat 504, a character 506 as "Marry Poppins", and an umbrella 508. In the frame 502, the character 510 and the character 512 may be occluded from a view. Further, the system 110 may implement artificial intelligence component 235 to determine the plurality of image proposals 245 as indicated by a line 524 for the character 510 and a line 526 for the character 512. The system may implement the first cognitive learning operation 250 to identify the face identity model for the character 506 to include the hat 504 and the umbrella 508.

Figure 5B:
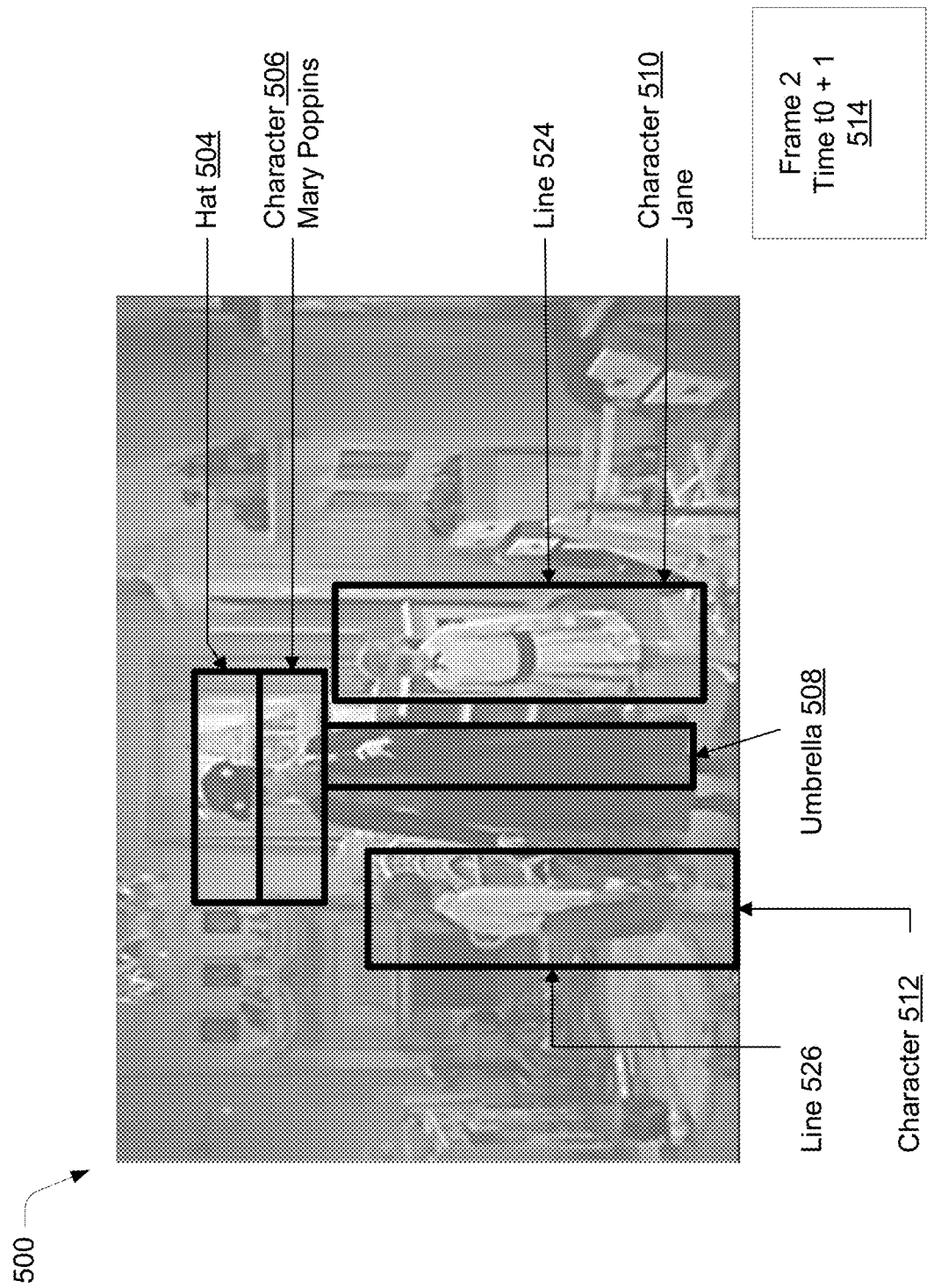

FIG. 5B may include a frame 514. The frame 514 may be a frame from the plurality of frames 225. The frame 514 may indicate a time to be at a stage zero plus 1 (0+1) for indicating that the frame 514 may be a second frame for the process 500. The system 110 may implement the artificial intelligence component 235, and the first cognitive learning operation 250 to identify the character 510 as "Jane". In the frame 514, the character 512 may be occluded from a view. Further, the system 110 may implement artificial intelligence component 235 to determine the plurality of image proposals 245 as indicated by the line 526 for the character 512. The system 110 may implement the second cognitive learning operation 275 to transfer known objects like the hat 504, the umbrella 508, and the identity of the character 506 from the frame 502 to the frame 514.

Figure 5C:

FIG. 5C may include a frame 516. The frame 516 may be a frame from the plurality of frames 225. The frame 516 may indicate a time to be at a stage zero plus two (0+2) for indicating that the frame 516 may be a third frame for the process 500. The system 110 may implement the artificial intelligence component 235, and the first cognitive learning operation 250 to identify the character 512 as "Michael". The system 110 may implement the second cognitive learning operation 275 to transfer known objects like the hat 504, the umbrella 508, the identity of the character 506, and the identity of the character 510 from the frame 502 to the frame 516.

FIG. 5D may include a frame 518. The frame 518 may be a frame from the plurality of frames 225. The frame 518 may indicate a time to be at a stage zero plus three (0+3) for indicating that the frame 518 may be a fourth frame for the process 500. The system 110 may detect a character 506 in the frame 518. The character 506 may be partially occluded from a view in the frame 518. Further, the system 110 may implement artificial intelligence component 235 to determine the plurality of image proposals 245 as indicated by a line 528 for the character 506. In an example, the system 110 may implement the second cognitive learning operation 275 and identify the character 506 as being same as the character 506 based on the tagged face identity model 265 to include the hat 504 for the character 506 and the character 506 may also include the hat 504.

Figure 5E:
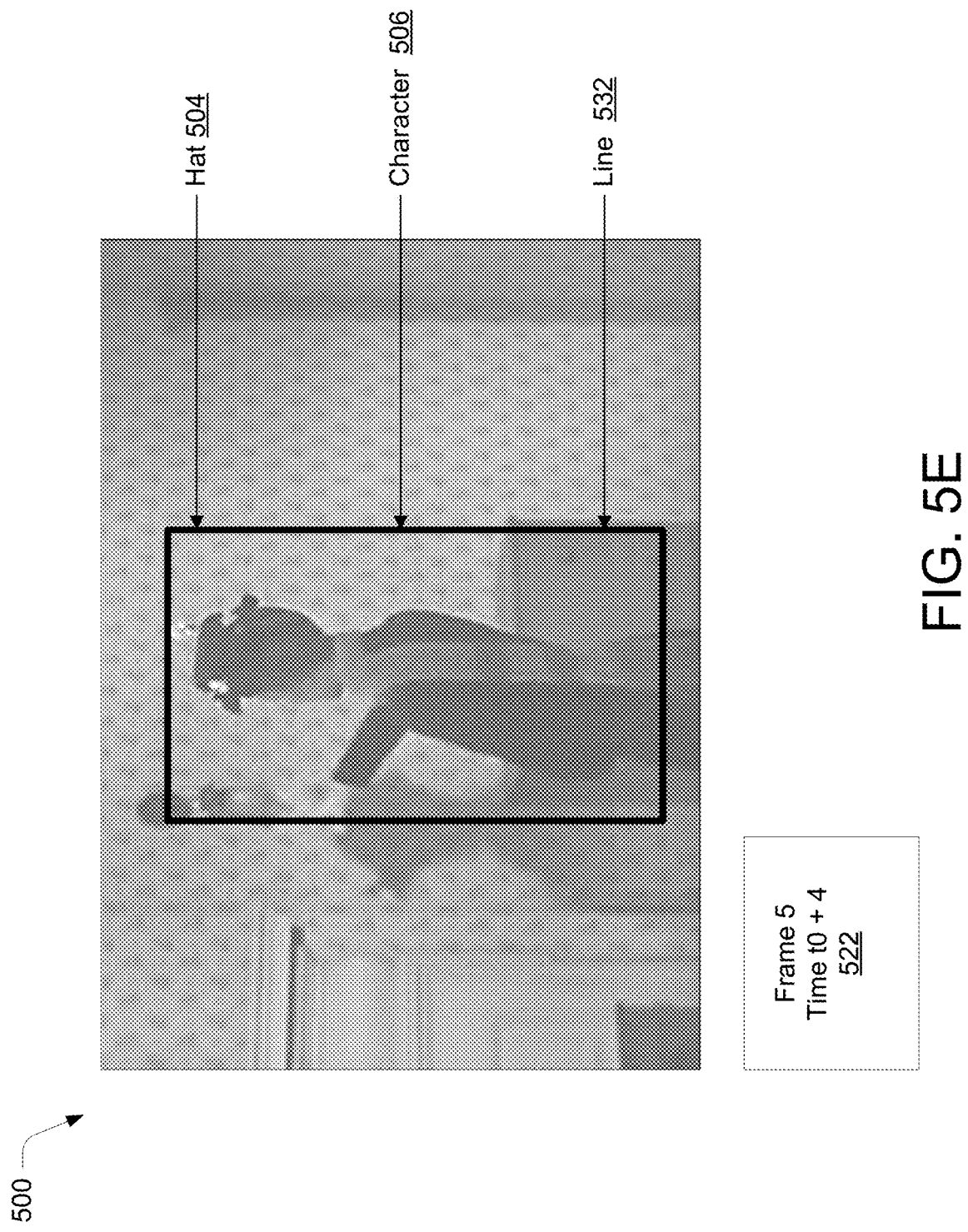

FIG. 5E may include a frame 522. The frame 522 may be a frame from the plurality of frames 225. The frame 522 may indicate a time to be at a stage zero plus four (0+4) for indicating that the frame 522 may be a fifth frame for the process 500. The system 110 may detect a character 506 in the frame 522. The character 506 may be partially occluded from a view in the frame 522. Further, the system 110 may implement artificial intelligence component 235 to determine the plurality of image proposals 245 as indicated by a line 532 for the character 506. In an example, the system 110 may implement the second cognitive learning operation 275 and identify the character 506 as being same as the character 506 based on the tagged face identity model 265 to include the hat 504 for the character 506 and the character 506 may also include the hat 504.

FIG. 6A-6E illustrate a use case pictorial representation of a process for objection detection, image recognition and cognitive tracking based on the character recognition system, according to an example embodiment of the present disclosure. All the components of the system 110 as described by way of FIG. 1 and FIG. 2 may be applicable for the process 600. For the sake of brevity and technical clarity, the explanation of the various components of the system 110 as provided by FIG. 1., and FIG. 2 may be not repeated for an explanation of the process 600. The process 600 may pertain to an embodiment of the present disclosure, wherein the system 110 may recognize various characters in the video clip 220.

Figure 6A:
FIGS. 6A-6E illustrate a use case pictorial representation of a process for objection detection, image recognition and cognitive tracking based on the system for character recognition, according to an example embodiment of the present disclosure

FIG. 6A may include a frame 602. The frame 602 may be a frame from the plurality of frames 225. The frame 602 may indicate a time to be at a stage zero for indicating that the frame 602 may be a first frame for the process 600. The frame 602 may include a character 604, and a character 606. In the pictorial representation depicted by FIG. 6A, the character 606 may be partially occluded from a view and the character 604 may be visible. As mentioned above, the system 110 may implement the artificial intelligence component 235 to determine the plurality of image proposals 245 as indicated by a line 620 for the character 606 and a line 622 for the character 604. The system 110 may implement the artificial intelligence component 235, and the first cognitive learning operation 250 for identifying the character 604 as "Andy Davis" due the character 604 being visible in the frame 602.

Figure 6B:
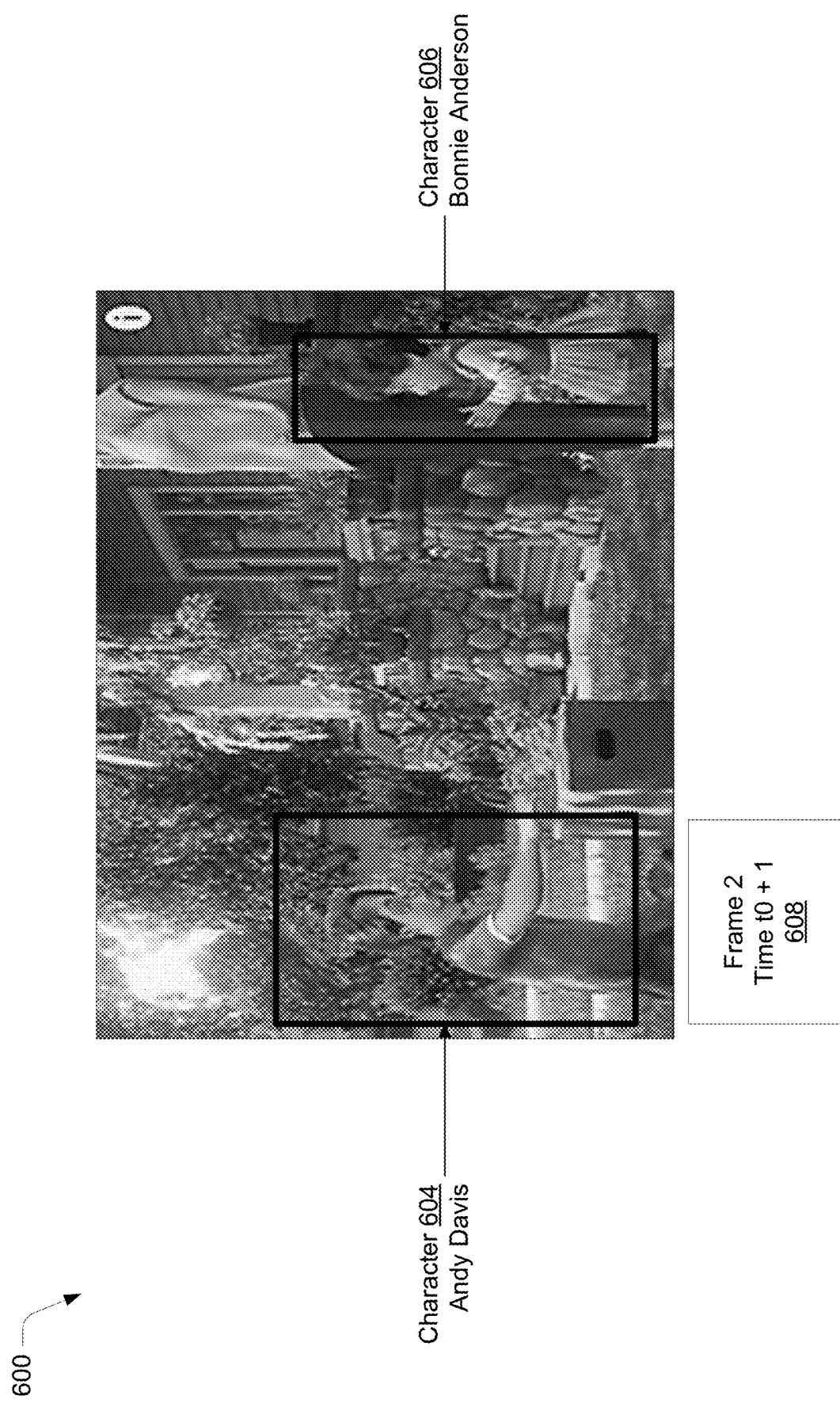

FIG. 6B may include a frame 608. The frame 608 may be a frame from the plurality of frames 225. The frame 608 may indicate a time to be at a stage zero plus one (0+1) for indicating that the frame 608 may be a second frame for the process 600. The frame 608 may include the character 604, and the character 606. The system 110 may implement the artificial intelligence component 235, and the first cognitive learning operation 250 for identifying the character 606 as "Bonnie Anderson" and the character 604 as "Andy Davis" due the character 604 and the character 606 being visible in the frame 608.

Figure 6C:

FIG. 6C may include a frame 612. The frame 612 may be a frame from the plurality of frames 225. The frame 612 may indicate a time to be at a stage zero plus two (0+2) for indicating that the frame 612 may be a third frame for the process 600. The frame 612 may include a character 610.

The system 110 may implement the artificial intelligence component 235, and the first cognitive learning operation 250 for identifying the character 610 as "Jessie" due to the character 610 being visible in the frame 612.

Figure 6D:

FIG. 6D may include a frame 614. The frame 614 may be a frame from the plurality of frames 225. The frame 614 may indicate a time to be at a stage zero plus three (0+3) for indicating that the frame 614 may be a fourth frame for the process 600. The system 110 may implement the artificial intelligence component 235, the first cognitive learning operation 250, second cognitive learning operation 275 for identifying the character 604, character 606, and character 610 in the frame 614. The system 110 may implement the second cognitive learning operation 274 to transfer the identity for the character 604, and character 610 from the frame 602 and the frame 612 to the frame 614.

Figure 6E:
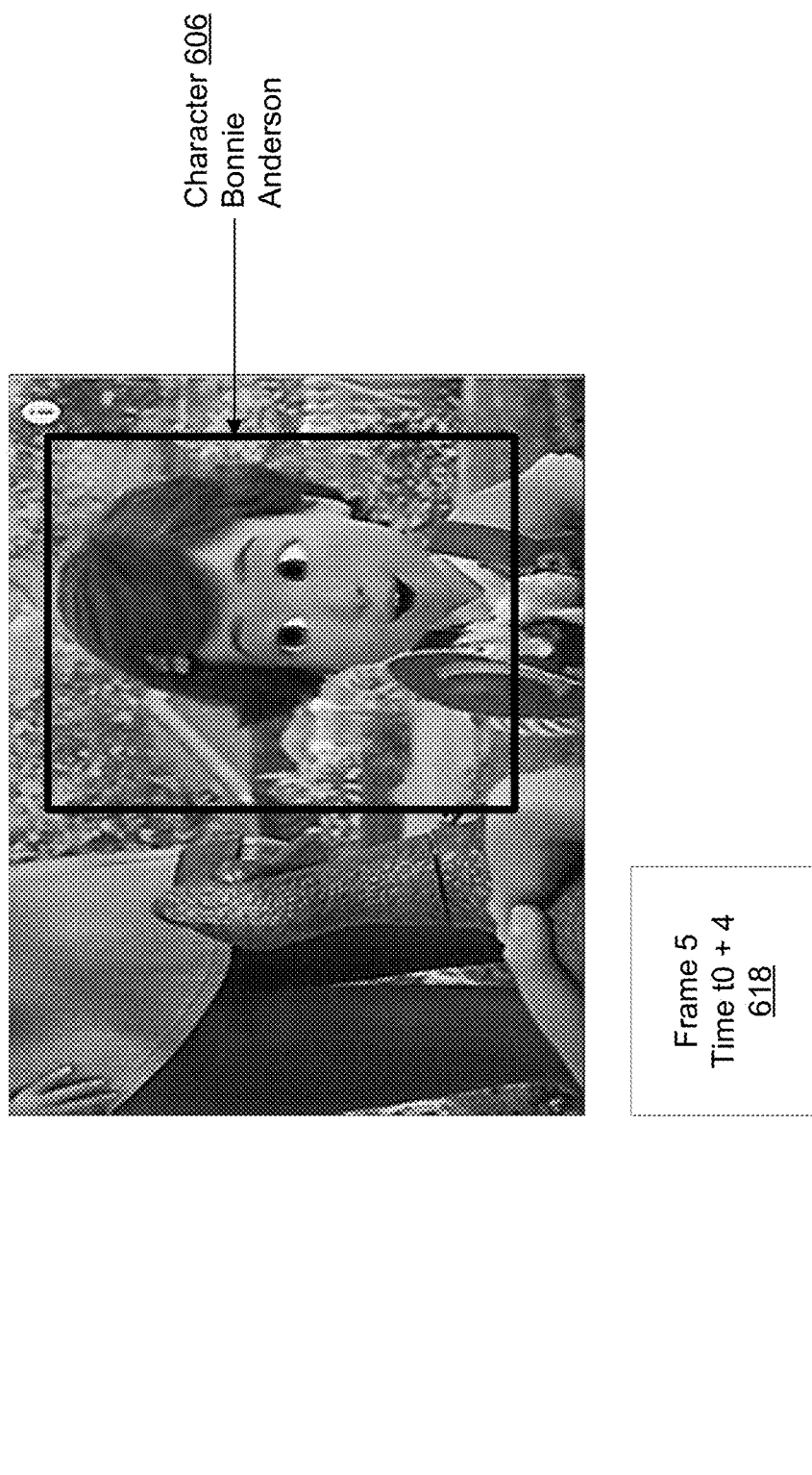

FIG. 6E may include a frame 618. The frame 618 may be a frame from the plurality of frames 225. The frame 618 may indicate a time to be at a stage zero plus four (0+4) for indicating that the frame 612 may be a fifth frame for the process 600. The system 110 may implement the artificial intelligence component 235, and the first cognitive learning operation 250 for identifying a character 606 as "Bonnie Anderson" due to the characters being visible in the frame 618.

FIG. 7A-7E illustrate a use case pictorial representation of a process 700 for objection detection, image recognition and cognitive tracking based on the character recognition system 110, according to an example embodiment of the present disclosure. All the components of the system 110 as described by way of FIG. 1 and FIG. 2 may be applicable for the process 700. For the sake of brevity and technical clarity, the explanation of the various components of the system 110 as provided by FIG. 1. and FIG. 2 may be not repeated for an explanation of the process 700. The process 400 may pertain to an embodiment of the present disclosure, wherein the system 110 may recognize various players in a sports event. The sports event may be a real-time video clip 220.

Figure 7A:
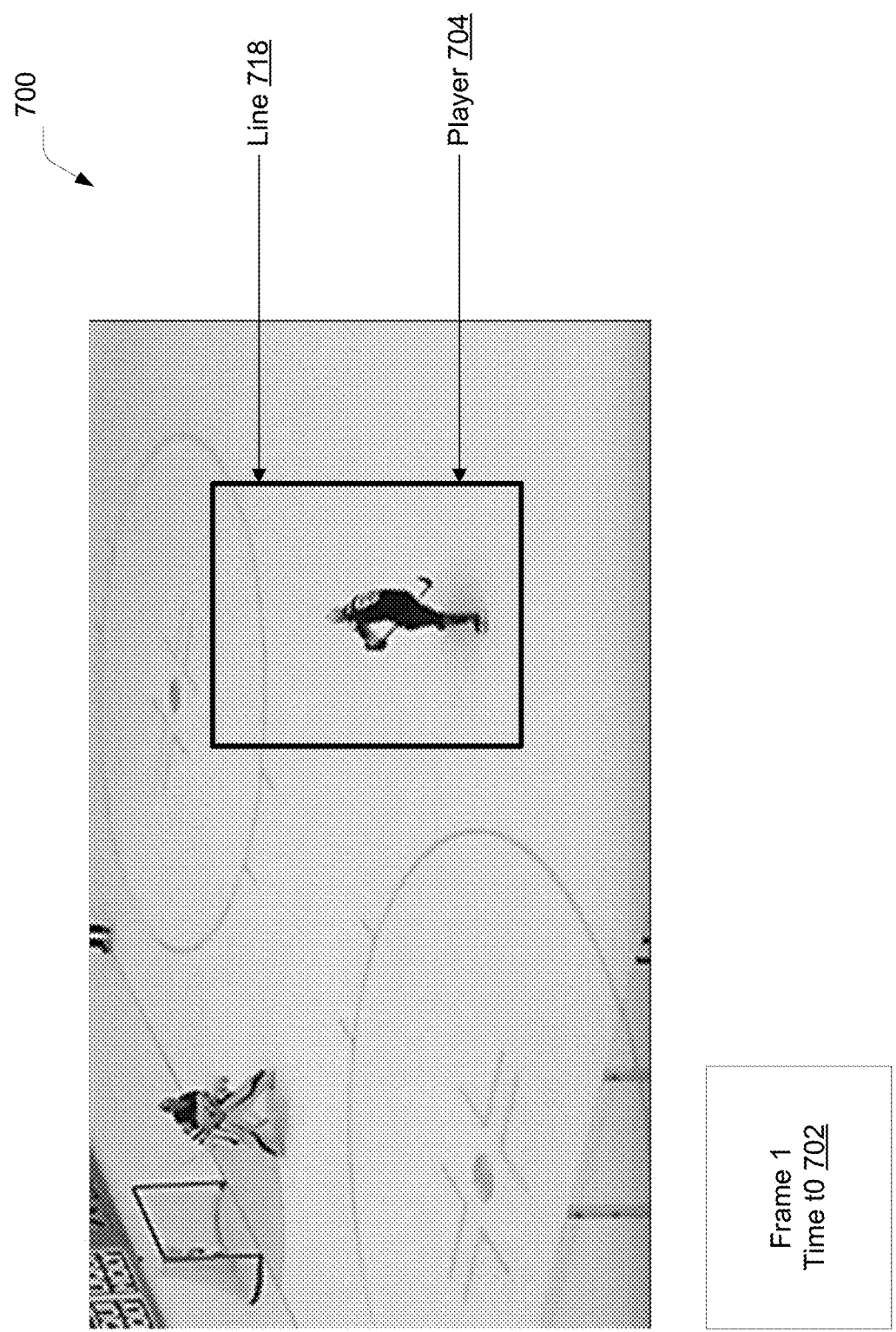
FIGS. 7A-7E illustrate a use case pictorial representation of a process for objection detection, image recognition and cognitive tracking based on the system for character recognition, according to an example embodiment of the present disclosure.

FIG. 7A may include a frame 702. The frame 702 may be a frame from the plurality of frames 225. The frame 702 may indicate a time to be at a stage zero for indicating that the frame 702 may be a first frame for the process 700. The frame 702 may include a player 704. The player 704 may be partially occluded from a view in the frame 702. As mentioned above, the system 110 may implement the artificial intelligence component 235 to determine the plurality of image proposals 245 as indicated by a line 718 for the player 704.

Figure 7B:
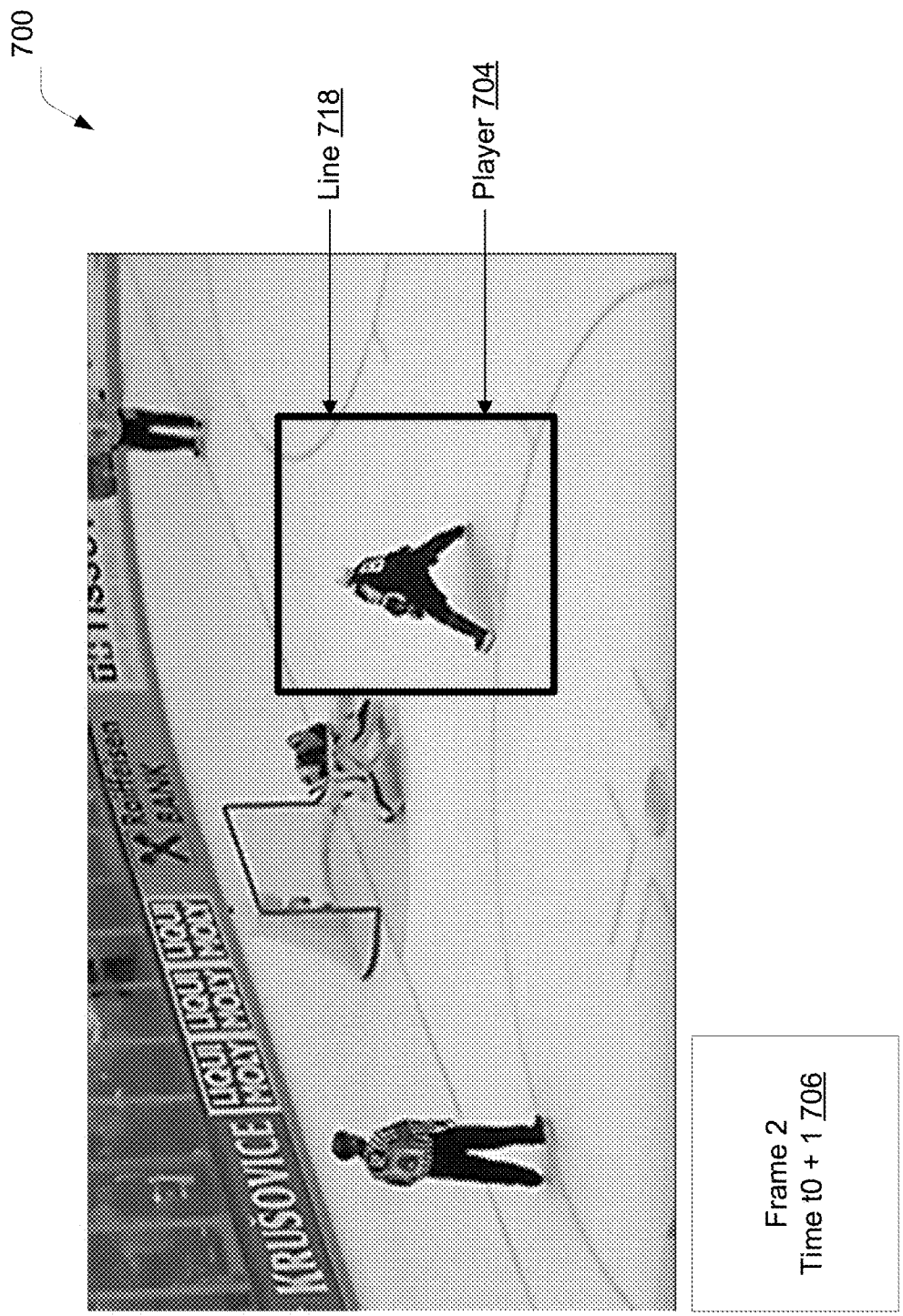

FIG. 7B may include a frame 706. The frame 706 may be a frame from the plurality of frames 225. The frame 706 may indicate a time to be at a stage zero plus one (0+1) for indicating that the frame 706 may be a second frame for the process 700. The frame 706 may include the player 704. The player 704 may be partially occluded from a view in the frame 706. As mentioned above, the system 110 may implement the artificial intelligence component 235 to determine the plurality of image proposals 245 as indicated by the line 718 for the player 704. The system 110 may deploy the implement the artificial intelligence component 235 to identify the player 704 from multiple players visible in the frame 706.

Figure 7C:
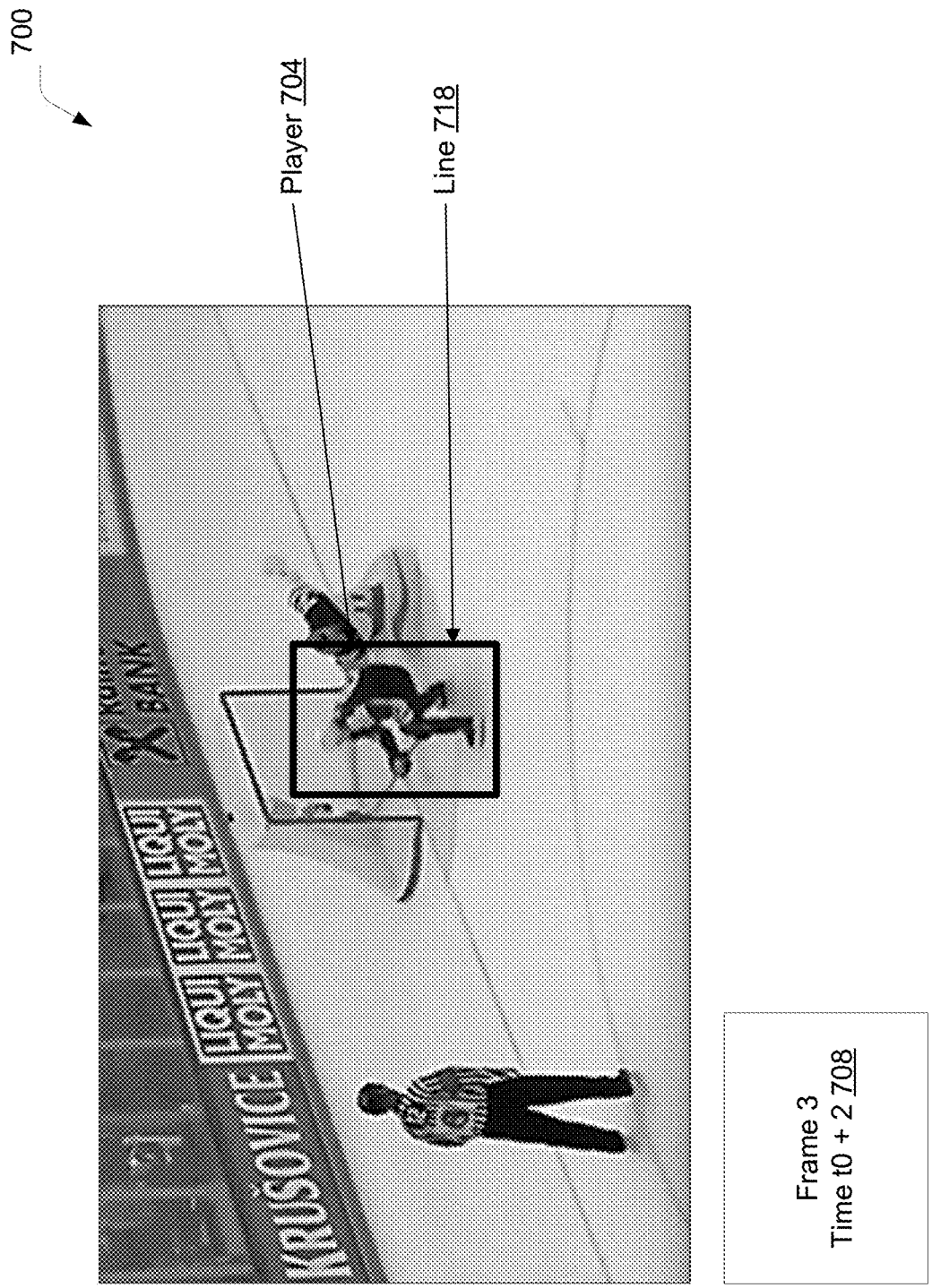

FIG. 7C may include a frame 708. The frame 708 may be a frame from the plurality of frames 225. The frame 708 may indicate a time to be at a stage zero plus two (0+2) for indicating that the frame 708 may be a third frame for the process 700. The frame 708 may include the player 704. The player 704 may be partially occluded from a view in the frame 708. As mentioned above, the system 110 may implement the artificial intelligence component 235 to determine the plurality of image proposals 245 as indicated by the line 718 for the player 704. The system 110 may deploy the implement the artificial intelligence component 235 to identify the player 704 from multiple players visible in the frame 708.

Figure 7D:
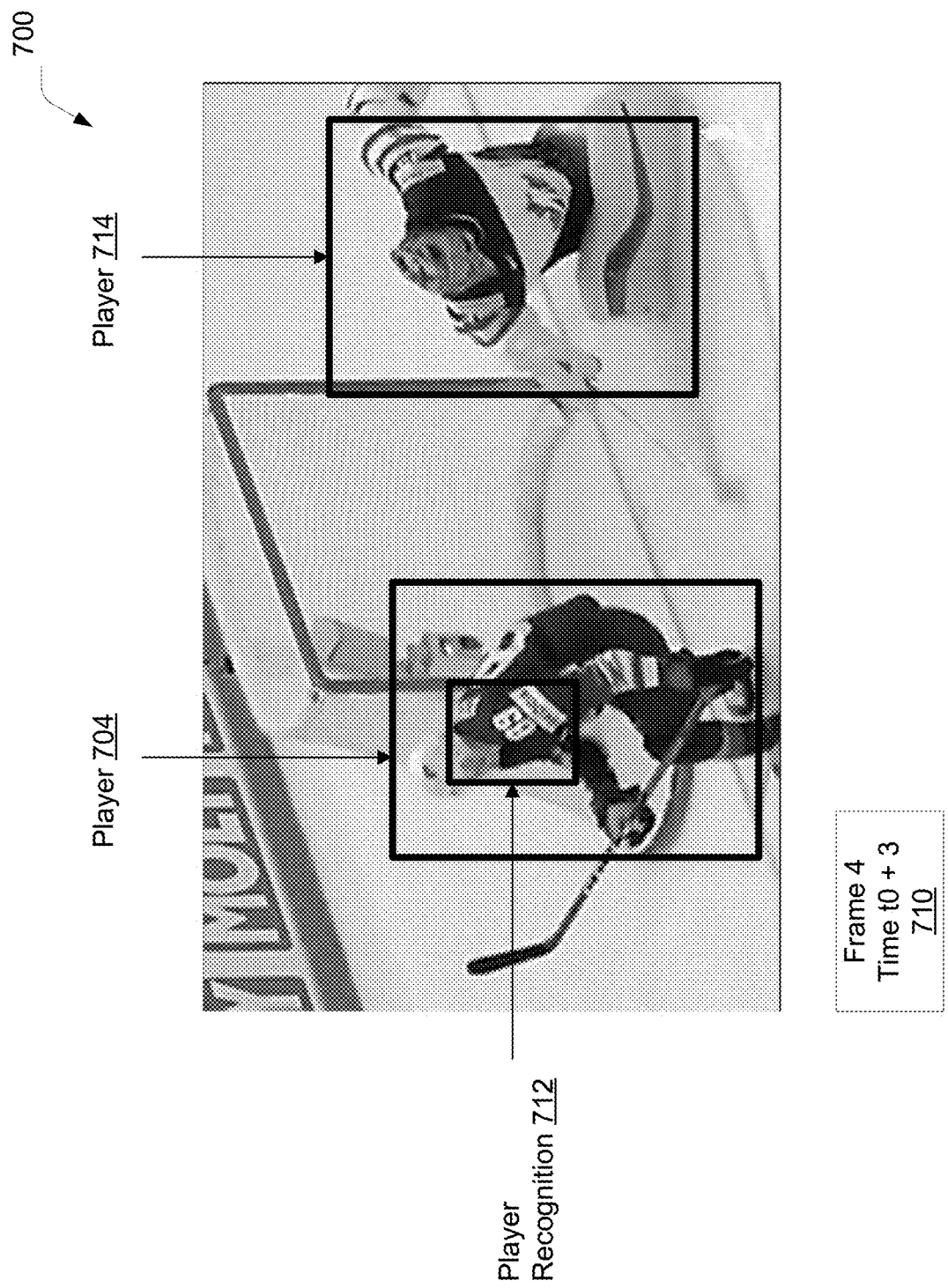

FIG. 7D may include a frame 710. The frame 710 may be a frame from the plurality of frames 225. The frame 710 may indicate a time to be at a stage zero plus three (0+3) for indicating that the frame 710 may be a fourth frame for the process 700. The frame 710 may include the player 704 and a player recognition 712. The system 110 may implement the artificial intelligence component 235 for identifying the player recognition 712. The system 110 may implement the first cognitive learning operation 250 for associating the player recognition 712 with the player 704. The player recognition 712 along with the player 704 may form the face identity model for the player 704. For example, the system may associate the presence of the player recognition 712 with the identity of the player 704. The player 704 may be partially occluded from a view in the frame 710. The system 110 may deploy the implement the artificial intelligence component 235 to identify a player 714 along with the player 704 in the frame 710. The system 110 may deduce that no distinguishing features of the player 714 may be visible in the frame 710 and hence record the presence of the player 714 and identify pertinent distinguishing features for the player 714 in other parts of the video clip.

Figure 7E:
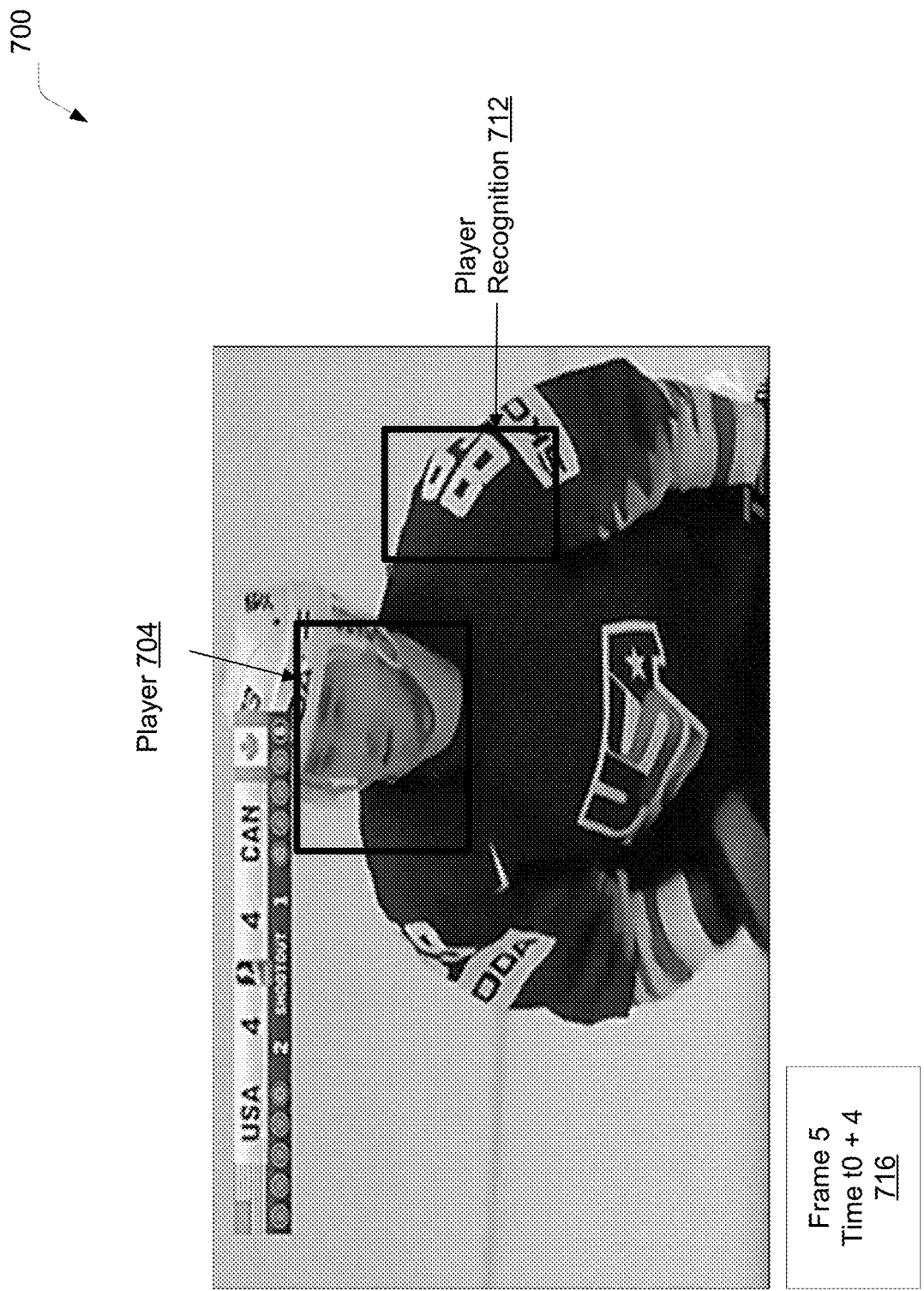

FIG. 7E may include a frame 716. The frame 716 may be a frame from the plurality of frames 225. The frame 716 may indicate a time to be at a stage zero plus four (0+4) for indicating that the frame 716 may be a fifth frame for the process 700. The frame 716 may include the player 704. The player 704 may be visible in the frame 716. As mentioned above, the system 110 may implement the first cognitive learning operation 250 to determine the identify the face identity for the player 704. The system 110 may implement the second cognitive learning operation 275 to transfer the identity of the player 704 from the frame 716 to any of the frame 702, the frame 706, the frame 708, and the frame 712.

Figure 8A:
FIGS. 8A-8C illustrate a use case pictorial representation of a process for objection detection, image recognition and cognitive tracking based on the system for character recognition, according to an example embodiment of the present disclosure.
Figure 8B:
Figure 8C:

FIG. 8A-8C illustrate a use case pictorial representation of a process for objection detection, image recognition and cognitive tracking based on the character recognition system, according to an example embodiment of the present disclosure. All the components of the system 110 as described by way of FIG. 1 and FIG. 2 may be applicable for the process 800. For the sake of brevity and technical clarity, the explanation of the various components of the system 110 as provided by FIG. 1. and FIG. 2 may be not repeated for an explanation of the process 800. The process 800 may pertain to an embodiment of the present disclosure, wherein the system 110 may validate the placement of a product in the video clip 220.

FIG. 8A may include a frame 804. The frame 804 may be a frame from the plurality of frames 225. The frame 804 may indicate a time to be at a stage zero for indicating that the frame 804 may be a first frame for the process 800. The frame 804 may include an object 802. As mentioned above, the system 110 may implement the artificial intelligence component 235 and the first cognitive learning operation 250 to determine the identity of the object 802 and allocate the object name 260 to the object 802. The system 110 may generate the visual data feature map 2330 for the object 802. The system 110 may implement the first cognitive learning operation 250 to determine the face identity model 265 for the object 802. The system 110 may implement the first cognitive learning operation 250 to tag the face identity model 265 for the object 802 with the object name 260 and related visual media data to determine the tagged face identity model 270 for the object 802.

FIG. 8B may include a frame 806. The frame 806 may be a frame from the plurality of frames 225. The frame 806 may indicate a time to be at a stage zero plus one (0+1) for indicating that the frame 806 may be a second frame for the process 800. The frame 806 may include the object 802. As mentioned above, the system 110 may implement the second cognitive learning operation 275 determine whether the tagged face identity model 270 for the object 802 may corroborating with the visual media feature map 230 for the frame 806.

FIG. 8C may include a frame 808. The frame 808 may be a frame from the plurality of frames 225. The frame 808 may indicate a time to be at a stage zero plus two (0+2) for indicating that the frame 808 may be a third frame for the process 800. The frame 808 may include the object 802. As mentioned above, the system 110 may implement the second cognitive learning operation 275 determine whether the tagged face identity model 270 for the object 802 may corroborating with the visual media feature map 230 for the frame 808.

The system 110 may generate the visual data feature map 230, the plurality of regions 240, and the plurality of image proposals 245 by implementing the artificial intelligence component 235 for any of the components of the process 400, the process 500, the process 600, the process 700, and the process 800. The system 110 may determine the appurtenance index 285 by implementing the second cognitive learning operation 275 for any of the components of the process 400, the process 500, the process 600, the process 700, and the process 800. The system 110 may determine the face identity model 265 and the tagged face identity model 270 for any of the components of the process 400, the process 500, the process 600, the process 700, and the process 800.

Figure 9:
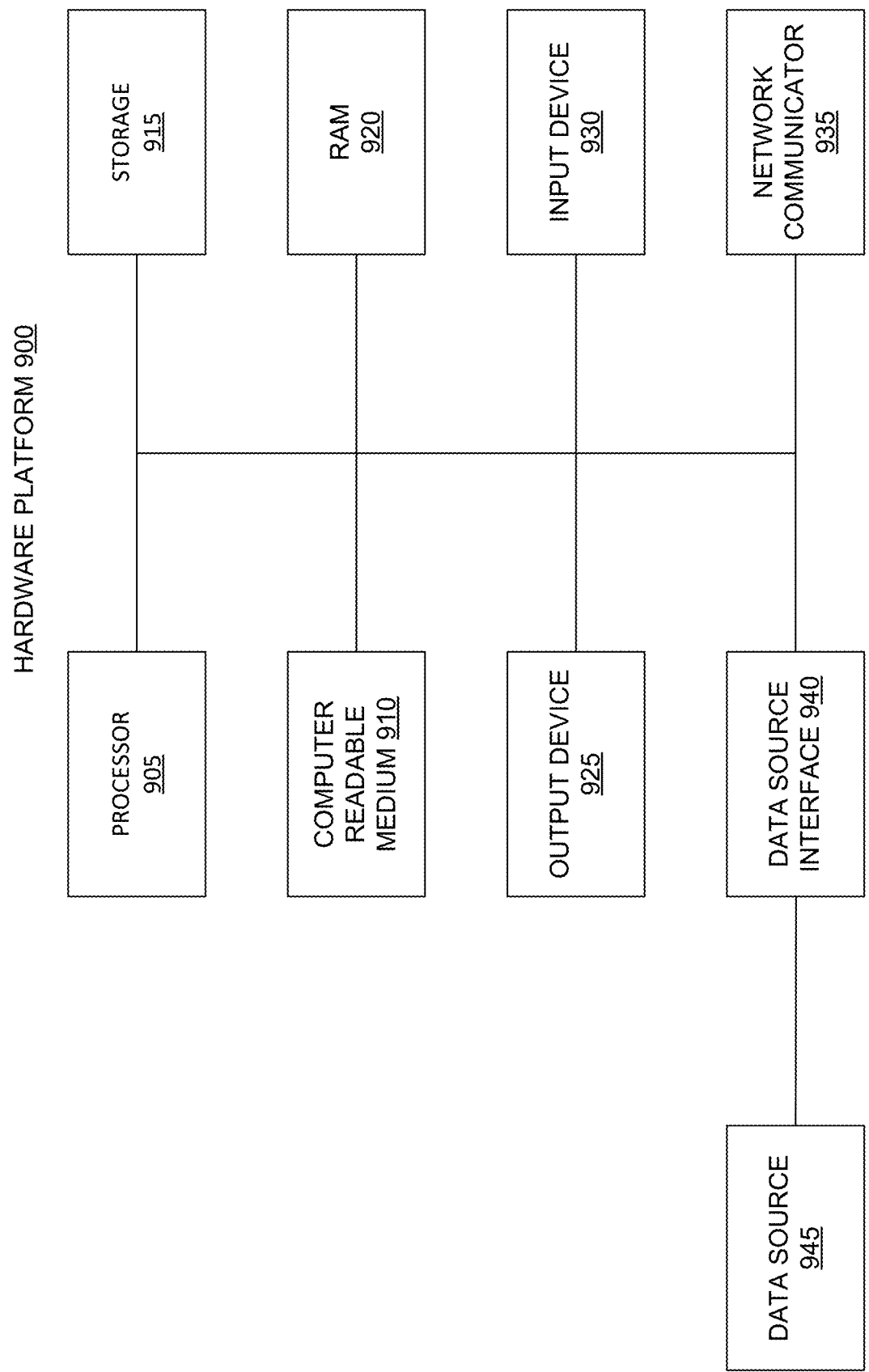
FIG. 9 illustrates a hardware platform for the implementation of the system for character recognition, according to an example embodiment of the present disclosure.

FIG. 9 illustrates a hardware platform 900 for implementation of the system 110, according to an example embodiment of the present disclosure. Particularly, computing machines such as but not limited to internal/external server clusters, quantum computers, desktops, laptops, smartphones, tablets and wearables which may be used to execute the system 110 or may have the structure of the hardware platform 900. The hardware platform 900 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 9, the hardware platform 900 may be a computer system 900 that may be used with the examples described herein. The computer system 900 may represent a computational platform that includes components that may be in a server or another computer system. The computer system 900 may execute, by a processor (e.g., a single or multiple processors) or other hardware processing circuit, the methods, functions and other processes described herein. These methods, functions and other processes may be embodied as machine-readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 900 may include a processor 905 that executes software instructions or code stored on a non-transitory computer-readable storage medium 910 to perform methods of the present disclosure. The software code includes, for example, instructions to gather data and documents and analyze documents. In an example, the object detector 130, the image recognizer 140 and the cognitive tracker 150 may be software codes or components performing these steps.

The instructions on the computer-readable storage medium 910 are read and stored the instructions in storage 915 or in random access memory (RAM) 920. The storage 915 provides a large space for keeping static data where at least some instructions could be stored for later execution. The stored instructions may be further compiled to generate other representations of the instructions and dynamically stored in the RAM 920. The processor 905 reads instructions from the RAM 920 and performs actions as instructed.

The computer system 900 further includes an output device 925 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 900 further includes input device 930 to provide a user or another device with mechanisms for entering data and/or otherwise interact with the computer system 900. The input device may include, for example, a keyboard, a keypad, a mouse, or a touchscreen. In an example, the output of the image recognizer 140 is displayed on the output device 925. Each of these output devices 925 and input devices 930 could be joined by one or more additional peripherals. In an example, the output device 925 may be used to display the results of the object detection result 280.

A network communicator 935 may be provided to connect the computer system 900 to a network and in turn to other devices connected to the network including other clients, servers, data stores, and interfaces, for instance. A network communicator 935 may include, for example, a network adapter such as a LAN adapter or a wireless adapter. The computer system 900 includes a data source interface 940 to access data source 945. A data source is an information resource. As an example, a database of exceptions and rules may be a data source. Moreover, knowledge repositories and curated data may be other examples of data sources. In an example, the video clip 220 220 may be the data source 945.

Figure 10A:
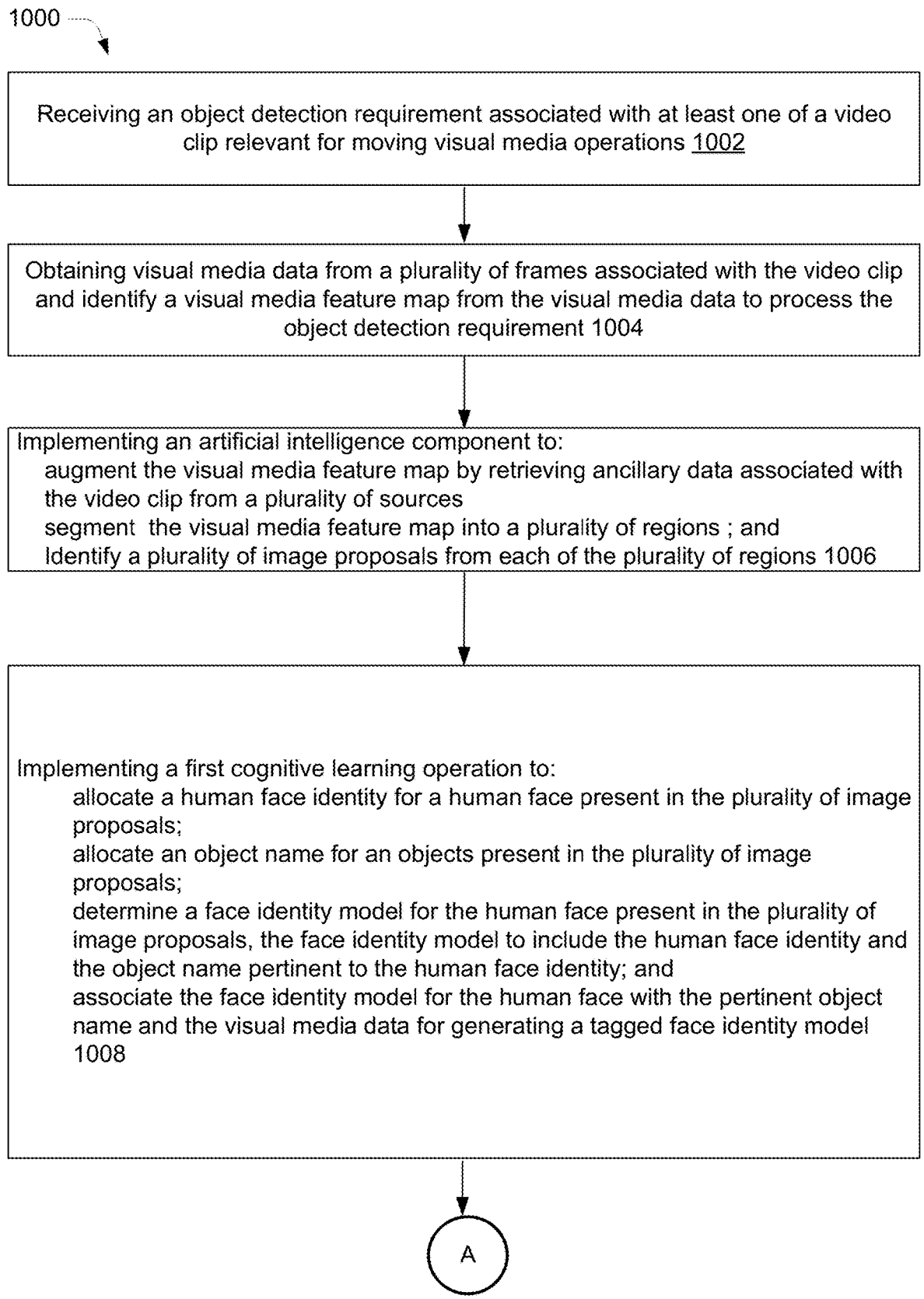
FIGS. 10A and 10B illustrate a process flowchart for a method for character recognition, according to an example embodiment of the present disclosure.
Figure 10B:
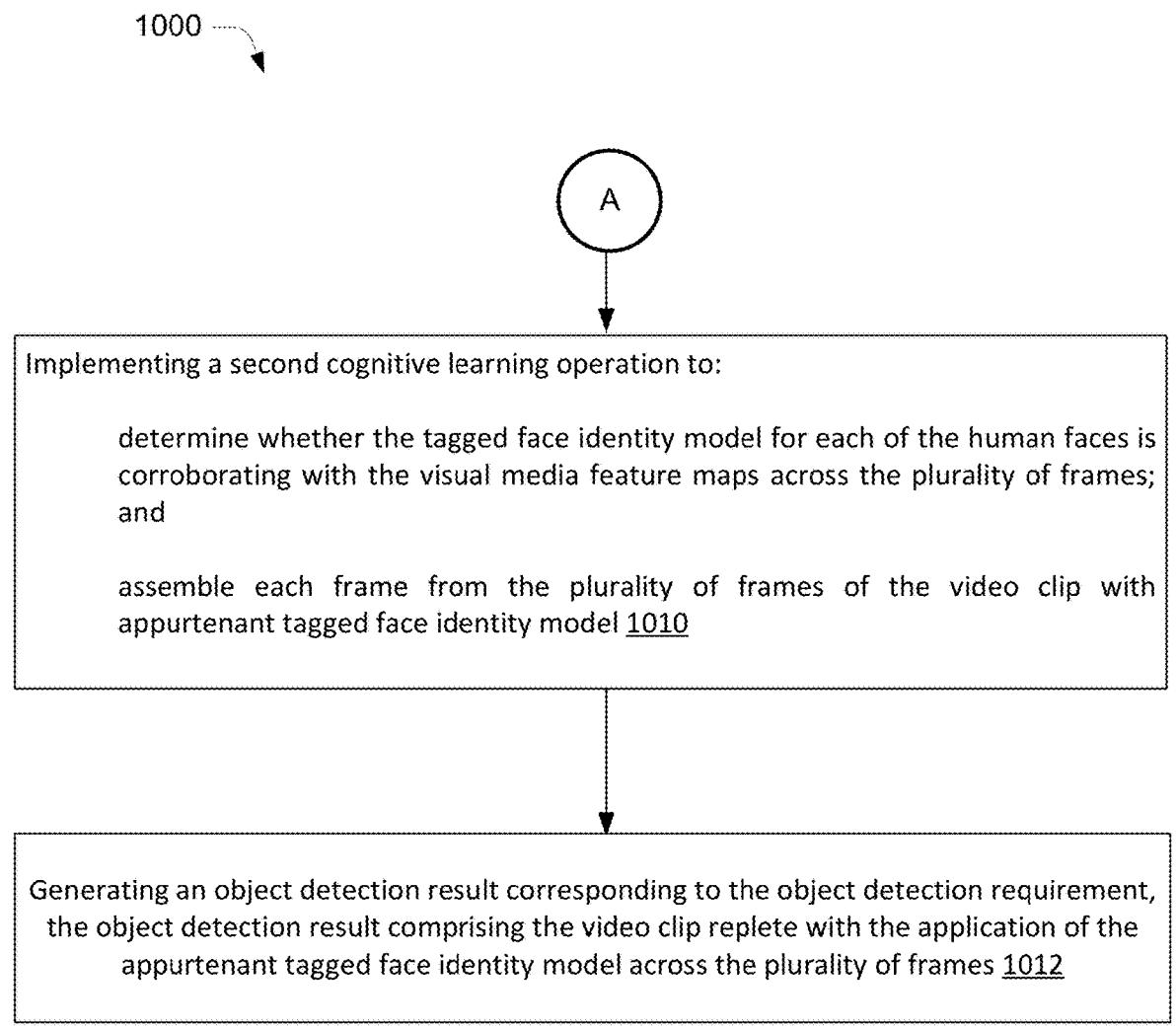

FIGS. 10A and 10B illustrate a method 1000 for character recognition system 110 according to an example embodiment of the present disclosure.

It should be understood that method steps are shown here for reference only and other combination of the steps may be possible. Further, the method 1000 may contain some steps in addition to the steps shown in FIG. 10. For the sake of brevity, construction and operational features of the system 110 which are explained in detail in the description of FIG. 1, FIG. 2, FIG. 3, FIG. 4, FIG. 5, FIG. 6, FIG. 7, FIG. 8, and FIG. 9 are not explained in detail in the description of FIG. 10. The method 1000 may be performed by a component of the system 110, such as the processor 120, the object detector 130, the image recognizer 140 and the cognitive tracker 150.

At block 1002, an object detection requirement 210 may be received from a user. The object detection requirement 210 may be pertaining to a video clip 220. In an example, clip 220 may include a real-time moving visual media At block 1004, a visual media feature map 230 may be identified from visual media data to process the object detection requirement 210. The visual media data may be obtained from a plurality of frames 225 associated with the video clip 220. In an example, the visual media data further comprise an image of a character, an image of an object, a name of the character, a label for the object, and an audio channel.

At block 1006, an artificial intelligence component 235 may be implemented to augment the visual media feature map 230 by retrieving ancillary data associated with the video clip 220 from a plurality of sources, segment the visual media feature map 230 into a plurality of regions 240, and identify a plurality of image proposals 245 from each of the plurality of regions 240. In an example, the plurality of sources used for augmenting the visual media feature map 230 to include an audio clip associated with the video clip 220, and a dataset associated with the human face identity 255 for the human face present in the plurality of image proposals 245.

At block 1008, a first cognitive learning operation 250 may be implemented to allocate a human face identity 255 for a human face present in the plurality of image proposals 245, allocate an object name 260 for an object present in the plurality of image proposals 245, determine a face identity model 265 for the human face present in the plurality of image proposals 245, and associate the face identity model 265 for the human face with the pertinent object name 260 and the visual media data for generating a tagged face identity model 270. The face identity model 265 to include the human face identity 255 and the object name 260 pertinent to the human face identity 255.

At block 1010, a second cognitive learning operation 275 may be implemented to determine whether the tagged face identity model 270 for the human face is corroborating with the visual media feature map 230 across the plurality of frames 225 and assemble a first frame from the plurality of frames 225 of the video clip 220 with an appurtenant tagged face identity model 270. In an example, the second cognitive learning operation 275 may be implemented to assemble a second frame from the plurality of frames 225 of the video clip 220 with the appurtenant tagged face identity model 270 of the first frame, wherein the second frame precedes the first frame in the video clip 220. In an example, the second cognitive learning operation 275 may be implemented for determining an appurtenance index 285 to indicate an accuracy level for application of the tagged face identity model 270 to a particular frame. In an example, the second cognitive learning operation 275 may be implemented for facilitating application of the tagged face identity model 270 to a frame from the plurality of frames 225 wherein a human face is occluded from a view and the object name 260 pertinent to the human face is visible in the frame.

At block 1012, an object detection result may be generated corresponding to the object detection requirement 210. The object detection result comprising the video clip 220 including the application of the appurtenant tagged face identity model 270 across the plurality of frames 225.

In an example, the method 1000 may be practiced using a non-transitory computer-readable medium. In an example, the method 1000 may be a computer-implemented method.

The present disclosure provides for continuous collection and analysis of information and may also provide relevant recommendations on demand, allowing users to gather information about characters in a video clip 220, even when the face of a character is temporarily occluded from a view. The present disclosure may substantially reduce the time required in processing a video clip 220 to add details about characters in each frame. The present disclosure for character recognition system 110 may eliminate substantial time spent on labor-intensive analysis, providing a huge boost in agility, responsiveness, and productivity.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
a processor;
an object detector coupled to the processor, the object detector to:
receive an object detection requirement pertaining to a video clip;
identify a visual media feature map from visual media data to process the object detection requirement, the visual media data being obtained from a plurality of frames associated with the video clip and;
implement an artificial intelligence component to:
augment the visual media feature map by retrieving ancillary data associated with the video clip from a plurality of sources;
segment the visual media feature map into a plurality of regions; and
identify a plurality of image proposals from each of the plurality of regions;
an image recognizer coupled to the processor, the image recognizer to:
implement a first cognitive learning operation to:
allocate a human face identity for a human face present in the plurality of image proposals;
allocate an object name for an object present in the plurality of image proposals;
determine a face identity model for the human face present in the plurality of image proposals, the face identity model to include the human face identity and the object name pertinent to the human face identity; and
associate the face identity model for the human face with the pertinent object name and the visual media data for generating a tagged face identity model; and
a cognitive tracker coupled to the processor, the cognitive tracker to:
implement a second cognitive learning operation to:
determine whether the tagged face identity model for the human face corroborates with the visual media feature map across the plurality of frames; and
assemble a first frame from the plurality of frames of the video clip with an appurtenant tagged face identity model; and
generate an object detection result corresponding to the object detection requirement, the object detection result comprising the video clip including the application of the appurtenant tagged face identity model across the plurality of frames.

2. The system as claimed in claim 1, wherein the visual media data further comprise an image of a character, an image of an object, a name of the character, a label for the object, and an audio channel.

3. The system as claimed in claim 1, wherein the cognitive tracker is to implement the second cognitive learning operation to assemble a second frame from the plurality of frames of the video clip with the appurtenant tagged face identity model of the first frame, wherein the second frame precedes the first frame in the video clip.

4. The system as claimed in claim 1, wherein the cognitive tracker is to further implement the second cognitive learning operation for determining an appurtenance index to indicate an accuracy level for application of the tagged face identity model to a particular frame.

5. The system as claimed in claim 1, wherein the video clip is to further comprise a real-time moving visual media.

6. The system as claimed in claim 1, herein the cognitive tracker is to further implement the second cognitive learning operation for facilitating application of the tagged face identity model to a frame from the plurality of frames wherein a human face is occluded from a view and the object name pertinent to the human face is visible in the frame.

7. The system as claimed in claim 1, wherein the plurality of sources used for augmenting the visual media feature map include an audio clip associated with the video clip, and a dataset associated with the human face identity for the human face present in the plurality of image proposals.

8. A method comprising:
receiving, by a processor, an object detection requirement pertaining to a video clip;
identifying, by the processor, a visual media feature map from visual media data to process the object detection requirement, the visual media data being obtained from a plurality of frames associated with the video clip;
implementing, by the processor, an artificial intelligence component to:
 augment the visual media feature map by retrieving ancillary data associated with the video clip from a plurality of sources;
 segment the visual media feature map into a plurality of regions; and
 identify a plurality of image proposals from each of the plurality of regions;
implementing, by the processor, a first cognitive learning operation to:
 allocate a human face identity for a human face present in the plurality of image proposals;
 allocate an object name for an object present in the plurality of image proposals;
 determine a face identity model for the human face present in the plurality of image proposals, the face identity model to include the human face identity and the object name pertinent to the human face identity; and
 associate the face identity model for the human face with the pertinent object name and the visual media data for generating a tagged face identity model;
implementing, by the processor, a second cognitive learning operation to:
 determine whether the tagged face identity model for the human face corroborates with the visual media feature map across the plurality of frames; and
 assemble a first frame from the plurality of frames of the video clip with an appurtenant tagged face identity model; and
generating, by the processor, an object detection result corresponding to the object detection requirement, the object detection result comprising the video clip including the application of the appurtenant tagged face identity model across the plurality of frames.

9. The method as claimed in claim 8, wherein the visual media data further comprise an image of a character, an image of an object, a name of the character, a label for the object, and an audio channel.

10. The method as claimed in claim 8, wherein the method further comprise implementing, by the processor, the second cognitive learning operation to assemble a second frame from the plurality of frames of the video clip with the appurtenant tagged face identity model of the first frame, wherein the second frame precedes the first frame in the video clip.

11. The method as claimed in claim 8, wherein the method further comprise implementing, by the processor, the second cognitive learning operation for determining an appurtenance index to indicate an accuracy level for application of the tagged face identity model to a particular frame.

12. The method as claimed in claim 8, wherein the video clip is to further comprise a real-time moving visual media.

13. The method as claimed in claim 8, wherein the method further comprise implementing, by the processor, the second cognitive learning operation for facilitating application of the tagged face identity model to a frame from the plurality of frames wherein a human face is occluded from a view and the object name pertinent to the human face is visible in the frame.

14. The method as claimed in claim 8, wherein the plurality of sources used for augmenting the visual media feature map include an audio clip associated with the video clip, and a dataset associated with the human face identity for the human face present in the plurality of image proposals.

15. A non-transitory computer readable medium including machine readable instructions that are executable by a processor to:
receive an object detection requirement pertaining to a video clip;
identify a visual media feature map from visual media data to process the object detection requirement, the visual media data being obtained from a plurality of frames associated with the video clip and;
implement an artificial intelligence component to:
 augment the visual media feature map by retrieving ancillary data associated with the video clip from a plurality of sources;
 segment the visual media feature map into a plurality of regions; and
 identify a plurality of image proposals from each of the plurality of regions;
implement a first cognitive learning operation to:
 allocate a human face identity for a human face present in the plurality of image proposals;
 allocate an object name for an object present in the plurality of image proposals;
 determine a face identity model for the human face present in the plurality of image proposals, the face identity model to include the human face identity and the object name pertinent to the human face identity; and
 associate the face identity model for the human face with the pertinent object name and the visual media data for generating a tagged face identity model;
implement a second cognitive learning operation to:
 determine whether the tagged face identity model for the human face corroborates with the visual media feature map across the plurality of frames; and assemble a first frame from the plurality of frames of the video clip with an appurtenant tagged face identity model; and generate an object detection result corresponding to the object detection requirement, the object detection result comprising the video clip including the application of the appurtenant tagged face identity model across the plurality of frames.

16. The non-transitory computer-readable medium of claim 15, wherein the processor is to implement the second cognitive learning operation to assemble a second frame from the plurality of frames of the video clip with the appurtenant tagged face identity model of the first frame, wherein the second frame precedes the first frame in the video clip.

17. The non-transitory computer-readable medium of claim 15, wherein the processor is to implement the second cognitive learning operation for determining an appurtenance index to indicate an accuracy level for application of the tagged face identity model to a particular frame.

18. The non-transitory computer-readable medium of claim 15, wherein the processor is to implement the second cognitive learning operation for facilitating application of the tagged face identity model to a frame from the plurality of frames wherein a human face is occluded from a view and the object name pertinent to the human face is visible in the frame.

19. The non-transitory computer-readable medium of claim 15, wherein the plurality of sources used for augmenting the visual media feature map include an audio clip associated with the video clip, and a dataset associated with the human face identity for the human face present in the plurality of image proposals.

20. The non-transitory computer-readable medium of claim 15, wherein the visual media data further comprise an image of a character, an image of an object, a name of the character, a label for the object, and an audio channel.

* * * * *